United States Patent [19]
Driskell et al.

[11] Patent Number: 6,072,493
[45] Date of Patent: Jun. 6, 2000

[54] SYSTEM AND METHOD FOR ASSOCIATING SERVICES INFORMATION WITH SELECTED ELEMENTS OF AN ORGANIZATION

[75] Inventors: Dwight D. Driskell, Birmingham, Ala.;
Michael Greenspan, New York, N.Y.;
Vivian C. Henley, Jackson, Miss.;
Nancy C. Lane, Birmingham, Ala.;
Lloyd MacFarlane, Mahopac, N.Y.;
Betty J. Nielsen, St. Amant, La.

[73] Assignee: BellSouth Corporation, Atlanta, Ga.

[21] Appl. No.: 09/050,333

[22] Filed: Mar. 30, 1998

Related U.S. Application Data

[60] Provisional application No. 60/042,211, Mar. 31, 1997.

[51] Int. Cl.[7] .............................. G06F 3/14; G06F 17/60
[52] U.S. Cl. ..................... 345/356; 345/357; 345/346; 345/353; 345/962; 705/26; 705/27
[58] Field of Search ................................ 345/357, 356, 345/346, 353, 962; 705/8, 26, 27

[56] References Cited

U.S. PATENT DOCUMENTS

| | | | |
|---|---|---|---|
| 4,989,141 | 1/1991 | Lyons et al. . | |
| 5,237,498 | 8/1993 | Tenma et al. . | |
| 5,283,865 | 2/1994 | Johnson | 345/357 |
| 5,353,219 | 10/1994 | Mueller et al. | 705/16 |
| 5,644,740 | 7/1997 | Kiuchi | 345/357 |
| 5,671,379 | 9/1997 | Kuse et al. | 345/346 |
| 5,745,687 | 4/1998 | Randell | 709/201 |
| 5,897,639 | 4/1999 | Greef et al. | 707/103 |

FOREIGN PATENT DOCUMENTS

| | | |
|---|---|---|
| WO 9731320 | 8/1997 | WIPO . |
| WO 9800804 | 1/1998 | WIPO . |

OTHER PUBLICATIONS

BellSouth Diskette Analyzer Bill User's Guide, Jul. 1994.

*Primary Examiner*—Raymond J. Bayerl
*Assistant Examiner*—Cuong T. Thai
*Attorney, Agent, or Firm*—Jones & Askew, LLP

[57] ABSTRACT

A system and method for providing and analyzing information regarding the association of services with elements of an organization. The system gathers information encoded in electronic form, organizes it into a services list, and correlates it with elements of an organization that are classified in an organizational hierarchy. A user of the system may examine a selected elements at any level of the organizational hierarchy and obtain information regarding all associated services, or vice versa. A user may further synchronize the services list and organizational hierarchy in such a manner that selection of an item from one displays corresponding data from the other.

14 Claims, 21 Drawing Sheets

Query

Month: Apr 1996

Category: Usage Charges

1106 XYZ Corporation
- Western Region
- Eastern Region
  - New York Area
    - MidTown Branch
    - Wall Street

| Field | Comparison | Value | Or | Or |
|---|---|---|---|---|
| Cell Method | Equal | 3rd Party | | |
| Provider | Equal | INTEGRETEL | Mutual Honor | |
| Billing Vendor | Equal | BELLSOUTH | | |

[Find] [Close]

FIG. 9

Review Monthly Bill

The XYZ Corporation
- Western Region
- Eastern Region
  - New York Area
    - MidTown Branch
      - Wall Street Invoice Month: Apr 1996
Billing Vendor: BELLSOUTH
Provider: <ALL>

|  | Mar 1996 | Apr 1996 | Variance |
|---|---|---|---|
| Monthly | 1,250.66 | 1,250.66 | 0.00 |
| Other Charges / Credits | 125.66 | 0.00 | [125.66] |
| Usage | 5,250.72 | 4,755.89 | [494.83] |
| Current Charges | 6627.04 | 6006.55 | [620.49] |
| Taxes And Fees | 602.56 | 556.72 | [45.84] |
| Total Charges | 7229.60 | 6563.27 | [666.33] |
| Balance Brought Forward |  | 7229.60 |  |
| Payments |  | 7229.60 |  |
| Adjustments |  | 0.00 |  |
| BALANCE DUE |  | 6563.27 |  |

[Report] [Exceptions] [Close]

Calls Exceptions

BY CALLS

◉ Longer Than  [60] ▭ Minutes

○ Costing More Than  [ ] ▭ Dollars

BY FREQUENTLY CALLED NUMBER

○ More Than [ ] ▭ Times

Based on
○ Full Dialed Number  ○ Area or Country Code

BY USERS

○ Top [ ] ▭ Users

By
○ Calls  ○ Cost  ○ Duration

[Report]  [Close]

FIG. 13

| Passwords | | | |
|---|---|---|---|
| Logon | Password | Type | Hierarchy Access |
| Angela | amgonzo | User | \ |
| David | dd | Admin | \ |
| Lloyd | lmt | Admin | \ |
| Michael | mbg | Admin | |
| Rick | rmd | User | \EREGGNNYAREA\WALL |
| | | | |

Logon Id: Rick
Password: rmd
Type: User ▽

- ☐ The XYZ Corporation
  - ☐ Western Region
  - ☐ Eastern Region
    - ☐ New York Area
      - ☐ MidTown Branch
        - ☐ Wall Street Hierarchy Access
\EREGGNNYAREA\WALL
☐ All Levels

[New] [Modify] [Delete] [Save] [Cancel] [Close]

FIG. 14

Hierarchy SetUp - The XYZ Corporation

File

What is the name of your Organization?  
[The XYZ Corporation]

How many levels are there in the Organizational Hierarchy?  
[3]

What is the name of each level of the Hierarchy?

| Level | Name |
|-------|------|
| 1 | Division |
| 2 | Branch |
| 3 | Department |

[Cancel] [< Back] [Next >] [Finish]

FIG.16

Hierarchy Setup - The XYZ Corporation

File

Division

SHORT NAME1

Hierarchy Member Info

| Short Name | ACCT | Short Name | The Accounting Department |

Address: 100 Main Street / Big City

Contact: John Smith

Tel.: 206-555-1212

*User Defined Fields*

1st User Field: G/L NUMBER

2nd User Field:

Save  Cancel  Close

Branch

Department

Cancel  < Back  Next >  Finish

FIG. 17

Assign Billed Items To Hierarchy Member

- ☐ The XYZ Corporation
  - ☐ Western Region
  - ☐ Eastern Region
    - ☐ New York Area
      - ☐ MidTown Branch
      - ☐ Wall Street 1. Select a member of the Hierarchy
2. Double-click an Unassigned Item to Assign it.

Unassigned Items

| Item | USOC |
|---|---|
| 2126618580 | |
| 2127895666 | BPHONE |

[Select All] [Assign]

Assigned Items

| Item | USOC | Owner |
|---|---|---|
| 2127779870 | OPX | MBGXLMFX1001 |

[Show All] [Select All] [Unassign] [Re-assign]

[Save] [Exit]

User Defined Report - Untitled

Calls By Calling Number By Date

Report Header

Report Fields

| Col. | Field Name | Status |
|---|---|---|
| 1 | CallingNumber | Visible |
| 2 | Date | |
| 3 | Time | Visible |
| 4 | CalledNumber | Visible |

Click to toggle the status

Sort By

| Field Name | Sort Order |
|---|---|
| CallingNumber | Ascending |
| Date | Ascending |
| Time | Ascending |

Major

Group By

| Field Name |
|---|
| CallingNumber |
| Date |

Major

Modify
Save
Save As...
Cancel
Close
Report

Special Report For Bob Smith

Report Footer

FIG. 20

SYSTEM AND METHOD FOR ASSOCIATING SERVICES INFORMATION WITH SELECTED ELEMENTS OF AN ORGANIZATION

RELATED APPLICATIONS

This application claims the filing priority of U.S. Provisional Application No. 60/042,211, filed on Mar. 31, 1997.

TECHNICAL FIELD

The present invention generally relates to analyzing the association of information with selected elements of a business organization. An element contemplates the parts of a business organization including without limitation subsidiaries, divisions, departments, branch offices, and individual members of the organization. More specifically, the present invention relates to providing information regarding the relationship of telecommunications services with selected elements of an organization.

BACKGROUND OF THE INVENTION

Information, from stock quotes, tennis scores, utility bills, etc. comes in many different forms and formats. In order for any information to be useful, however, it must be presented in a way that makes sense to the human mind. Raw data without context or format is meaningless, representing only wasted effort.

This need to analyze information has led to categorizing and formatting data in many different, yet comprehensible, ways. The aforementioned stock quotes appear on the trading floor as a standardized set of abbreviations and numbers; tennis scores are reported in agreed-upon terms such as "love" and "set"; and utility bills are shown in terms of dollars and cents. Despite this standardization in terms, the formatting, grouping, and method of delivery of information is often widely variable. With the advent of the digital age and widespread use of the computer, this has become an even more common problem. Information may be transmitted on a compact disc, via floppy disks, or across the Internet; it may be compressed by any number of different commercial utilities, placed in a database to be retrieved or sorted via specific data fields, or electronically transcribed according to a proprietary interface. Thus, a person may find it difficult, if not impossible, to accurately associate information with the elements or parts of a business organization that require this information.

An example may serve to effectively illustrate the difficulty of accurately and quickly associating information with selected elements or parts of a business organization, such as subsidiaries, divisions, departments, branch offices, and individual members of the business organization. Consider a corporation with branches in multiple states, each of which has subsidiary departments or offices located in different towns. From branch to branch, the corporation may find that different service providers offer the lowest rate for different services. Indeed, the preferred provider may vary from office to office within the same town based on location, volume of use, incentives offered, and the like. In such cases, the corporation may elect to engage multiple service providers. This in turn leads to multiple bills, all containing similar yet unique information, being sent to a single customer. Further, it is likely that these bills come in different formats and are differently organized. A customer may wish to standardize the costs incurred by his organization; a common way to do this is to assign the charges billed for every service to the element or part of the organization which incurred the charges. In order to accurately pass the cost of such services on to each subsidiary, division, department, or branch office of the business organization, the billing information must be correlated with individual uses of each service by the appropriate subsidiary, division, department, or branch offices of the corporation.

One possibility for associating the charges with the organization's constituent elements is that all bills are printed and sent directly to an accounting department, which then collates the bills, breaks the charges down by service and corporate element and assigns charges accordingly. Depending on the size of the corporation and the volume of calls, this task could employ dozens of people full-time.

Alternately, the service bills might be delivered encoded on a computer-readable medium, such as a compact disk or magnetic tape. In this manner, a computer could be employed in order to reduce the time necessary to correlate and assign charges to the appropriate corporate elements, such as subsidiaries, divisions, departments, branch offices, or individual members. However, in the case where multiple service providers are used, each service provider is likely to employ its own format when encoding billing information on the computer-readable medium. This necessitates extracting the information separately for each bill, inputting it in a common format into a single database or program, and then correlating the information with the corporate elements as required. This leads to increased cost in terms of both effort and money as a corporation is forced to devote resources to this task.

Rival service providers are unlikely to work together to standardize the format of their billing information. Instead a business organization is faced with little alternative to expending its own resources in order to place information into a common usable format, then correctly associate the billing information with the selected elements of the corporation. Further, this process must be repeated at great expense at every interval in which a set of bills is generated by the multiple service providers.

Additionally, it is often desirable to examine the information associated with a single element of the business organization rather than poring through all of the information associated with an overall organization. For example, the corporation mentioned in the foregoing example may be specifically concerned with the service charges incurred by a single operating division in order to better forecast a budget for an upcoming fiscal year. While the company may request the expense reports reflecting the charges incurred by the division, the information may be buried within the logs and not readily accessible. In such cases a considerable expense must be outlaid in order to search through past service logs, find the appropriate data, and convert it to a usable form.

The costs for accurately associating information with the elements of an organization are not limited to the preceding example. It may be seen that in any situation where information to be associated with individual elements of a business organization is transmitted in differing formats that this problem will be encountered. Stock prices received from various world markets to be correlated with shares held by multiple mutual funds provides yet another example in which the same problem may be encountered and similar costs incurred. Sports scores, banking data, or even the catalog of books in a library are further examples of types of information that come in different formats, yet lend themselves to association with individual elements of an organization.

Thus, there is a need for a system and method which associates and correlates information with the elements of a business organization.

There is a further need for a system and method which associates and correlates information with the elements of a business organization in the most cost-efficient and quickest manner possible.

In particular, there is a need for a system and method which minimizes the number of people required to accomplish the task of correlating information with the elements of a business organization.

There is also a need for a system which allows a user to examine only the information associated with a particular element of an organization.

SUMMARY OF THE PRESENT INVENTION

The present invention provides a system and method for associating services with a selected element of a business organization. In particular, the system and method of the present invention associate the information with elements of the organization by first arranging elements of the organization in the form of an organizational hierarchy.

The organizational hierarchy is then displayed on a display device such as a computer monitor. In operation, the system and method of the present invention display all organizational hierarchy information within a single area of the display device. This single area is referred to as a frame. Thus, the organizational hierarchy is displayed within a single frame. The frame is further divided into two subframes: a top subframe and a bottom subframe. In one embodiment of the present invention, the organizational hierarchy information is displayed within the top subframe.

The method of the present invention then arranges the services associated with the elements of the organization into a services list. The services list is display on the display device within the same frame as the organizational hierarchy information. In one embodiment of the present invention, the services list is displayed in the bottom subframe.

After displaying the services list on the display, the method of the present invention then correlates the elements of the organization with the services on the services list. This is done by correlating an element of the organization with each service that is associated with that element. More specifically, the method of the present invention correlates the organization's element with usage fees for each service associated with that element of the organization.

The method then generates a signal representing the selection of an element of the organization from the organizational hierarchy being displayed on the display device. In response to generation of the signal, the method of the present invention displays respectively on the display, a number for each service that is associated with the selected element of the organization and the number representing the number of applications of each service that is associated with the selected element of the organization. More specifically, the method of the present invention displays on the display device the usage fees for each service that is associated with the selected element of the organization.

Typically, the organizational hierarchy contains multiple elements for the business organization, each element with its own subelements or subdivisions. The subelements of the organizational hierarchy are also displayed in association with the organizational hierarchy on the display device.

In one embodiment, the subframes may also be further divided so that the frame is divided into quadrants. In this embodiment, different information is displayed in each of the quadrants. In this embodiment, the organizational hierarchy information is displayed in the top-left quadrant and a dynamic display of information corresponding to an element selected from the top-left quadrant is displayed in the top-right quadrant. The services list is displayed in the bottom-left quadrant, with a dynamic display of information corresponding to a selected service from the bottom-left quadrant being displayed in the bottomright quadrant.

Therefore, it is an object of the present invention to associate information with the elements of a business organization It is a further object of the present invention to provide association of information with the elements of a business organization in the most cost-efficient and quickest manner possible.

It is yet another object of the present invention to minimize the number of people required to perform the task of associating information with the elements of a business organization.

It is still another object of the present invention to allow a user to examine only the information associated with a particular element of a business organization.

Other objects, features, and advantages of the present invention will become apparent upon reading the specification, when taken in conjunction with the claims.

BRIEF DESCRIPTION OF THE DRAWINGS

FIG. 9–FIG. 21 relate to an integrated billing analysis and management system, which may incorporate the system and method for associating services information with selected elements of an organization. Specifically, FIG. 9 is a diagram of an exemplary Query screen display;

FIG. 10 is a diagram of an exemplary Invoice screen display

FIG. 11 is a diagram of an exemplary Calls Exceptions screen display;

FIG. 12 is a diagram of an exemplary System configuration parameters screen display;

FIG. 13 is a diagram of an exemplary Passwords screen display;

FIG. 14 is a diagram of an exemplary Hierarchy setup screen display;

FIG. 15 is another diagram of an exemplary Hierarchy setup screen display;

FIG. 16 is a diagram of an exemplary Hierarchy member information screen display;

FIG. 17 is a diagram of an exemplary Assign Billed Items to Hierarchy Member screen display;

FIG. 18 is a diagram of an exemplary Generate MagTape screen display;

FIG. 19 is a diagram of an exemplary Report menu;

FIG. 20 is a diagram of an exemplary User Defined Report screen display;

FIG. 21 is a diagram of an exemplary Batch Queue screen display;

DETAILED DESCRIPTION

Figure 1:
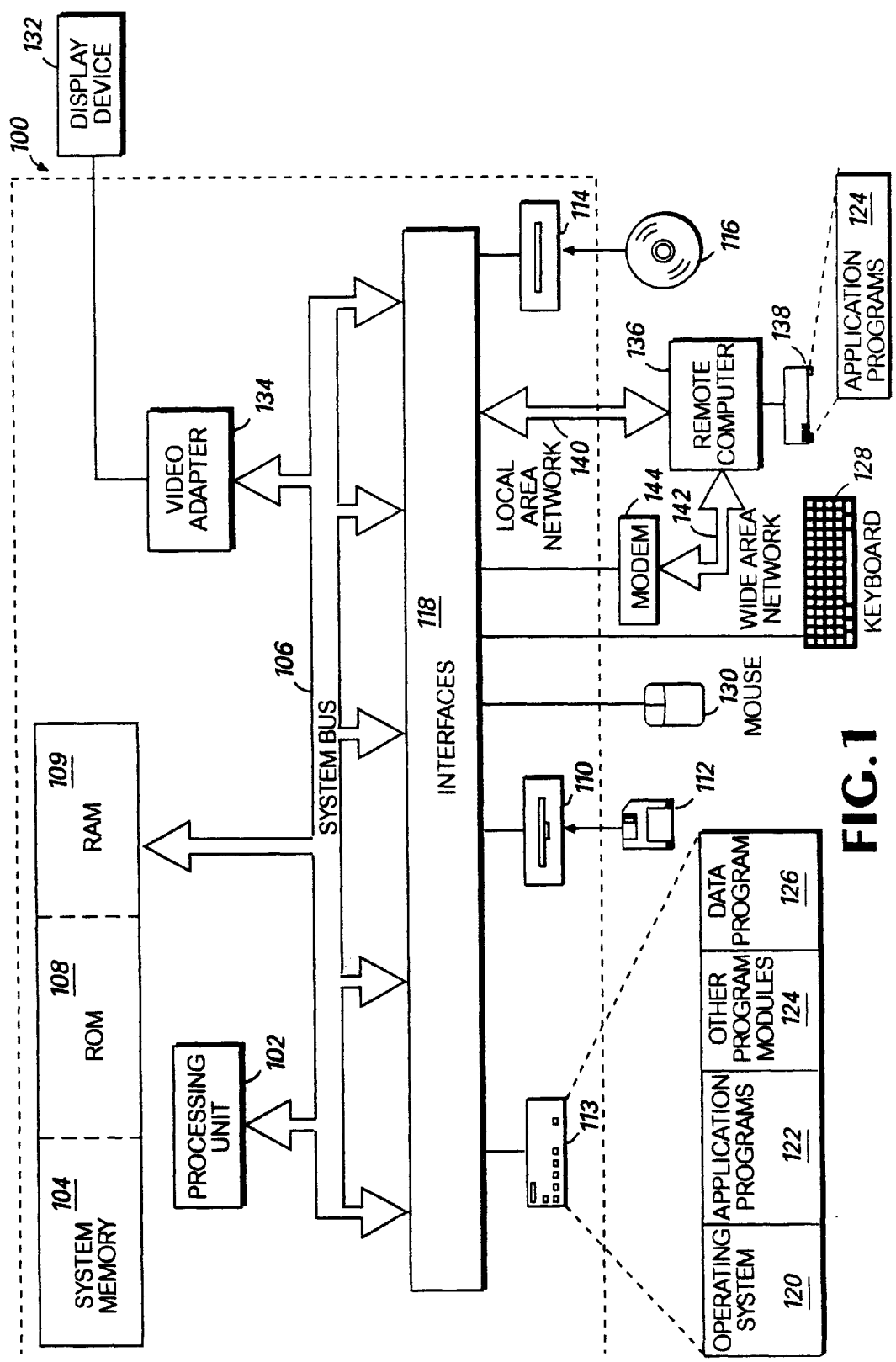
FIG. 1 is a diagram of the environment for operation of the present invention.

This detailed description first gives an overview of a first embodiment of the present invention. Then a description of the environment for the present invention is given with reference to FIG. 1. FIG. 2 details the operation of a first embodiment of the present invention, while FIGS. 3 through 7 show displays generated by the first embodiment and by a second embodiment of the present invention. FIG. 8 shows a flowchart detailing the operation of the present invention.
Overview of the First Embodiment Generally, the first embodiment of the present invention provides a system and method to associate information with particular elements of a business organization. "Information" may include any type of data which is subject to being quantified and related to a discrete element of an overall whole. Applying this definition, stock prices, scoring information, or global coordinates such as latitude and longitude are types of information that may be associated with the use of the present invention. An "element" is typically a subgroup of an overall organization; for example, a corporation may have subsidiaries, divisions, departments, branch offices, and individual members, while a sports association may have elements representing local competitive regions, with further elements in each region representing individual athletes. Preferably, these elements are related in such a manner that taken together they form an organizational hierarchy; that is, the topmost element represents the organization as a whole, while another set of elements of the organization represents a more detailed grouping of the organization, with yet another set of elements of the organization representing the constituent subgroups of each higher group. Thus, an organizational hierarchy is formed of at least one element, which may in turn consist of a number of subelements.

Using the example of a set of stocks, the organizational hierarchy might be defined as: the group of stocks comprising the New York Stock Exchange as the overall organization, an element in its own right; the next level of elements might represent such broad categories as "service" and "manufacturing" stocks; the manufacturing element may be further divided into "technical," "industrial," and "luxury" elements, each representing a smaller grouping of types of stocks, until eventually individual stocks comprise individual elements. These examples are meant for illustrative purposes only; it will be obvious to those of ordinary skill in the art that other possibilities for meeting the definitions of "information" and "element" as used herein exist.

A first embodiment further relates information in such a manner that taken together it forms a services list, similar in nature to the organizational hierarchy. That is, the topmost quantum of information represents the information as a whole, while other quanta of information represent more detailed groupings, with yet other sets of information representing information comprising the previous groups. A typical example of a services list might be astronomical data. The topmost quanta of information may be labeled "celestial coordinates", which could in turn be sorted by arcs of the sky. Each arc might be additionally comprised of further information broken down into planetary, stellar, and miscellaneous coordinates. These groups may then be further comprised of data representing the positions of various heavenly bodies. For ease of communication, the term "service" will be used in lieu of "quanta of information." The term "subservice" will be used to refer to a constituent element of a service hierarchically higher in the services list. It should be understood that this convention is solely for convenience and is not intended to limit the present invention in any way.

The associations generated by the first embodiment of the present invention may be further analyzed by displaying the services used by elements of an organization at any level in the organizational hierarchy. That is, the first embodiment may display an element located at a specific level in the organizational hierarchy and further display all services associated with that element. Advantageously, this allows a user of the present invention to correlate services to elements for either an entire organization, or if only a specific association is desired, to focus instead on individual elements of the organization.

By way of illustration, a corporation may have multiple bills from multiple service providers, each with charges representing the costs incurred by different groups (elements) within the corporation for use of the various provided services. The method of the present invention would then associate the charges for the services with the individual element of the organization that incurred such charges, and further display the associated charges and elements of the organization at any level in the organizational hierarchy.

The method of the present invention is executable on a standard personal computer. The first embodiment utilizes the display devices of the computer, such as a printer or monitor, to display the associated services and elements of the organization. The first embodiment further receives information to be associated in an electronic format contained on a computer-readable medium such as a removable diskette or a CD-ROM disk. Those skilled in the art will appreciate that many other means exist for electronically communicating information, such as via electronic mail, data packets sent across a modem, magnetic tape, etc. As an example, information may be received in the form of an electronic bill containing data such as the charges previously mentioned.

Preferably, all charges on an electronic bill are divided into major categories such as the following: (1) monthly charges; (2) other charges and credits; (3) usage; and (4) taxes and adjustments. Each of these major categories may be comprised of sub-categories. For example, the monthly charges category and the other charges and credits category may include a bulk billed sub-category. The first embodiment of the present invention generally displays this billing information pursuant to these categories.

The first embodiment of the present invention also provides a user with screen displays of information such that the user may review information from a service provider, and in particular, may review the services on the bill as they are associated with any particular element of an organization. For example, a customer who receives an electronic bill may use the first embodiment of the present invention to review a bill from a service provider, and in particular, may review the charges for services contained in the bill as they are assigned to any particular element of the customer's organization.

In short, the first embodiment of the present invention allows a user to analyze the association of a service with an element of an organization. This is accomplished by first generating an organizational hierarchy, comprised of elements of the organization, which is displayed in a subframe on a screen display. A services list, comprised of the individual services used by the organization is also generated and displayed on another subframe of the screen display. The user may then select one of the elements or one of the services included in the screen display; in response to this selection, the selected element or service is displayed along with the relevant associations between the selected element or service and correlated services or elements respectively.

Overview of the Environment

Figure 2:
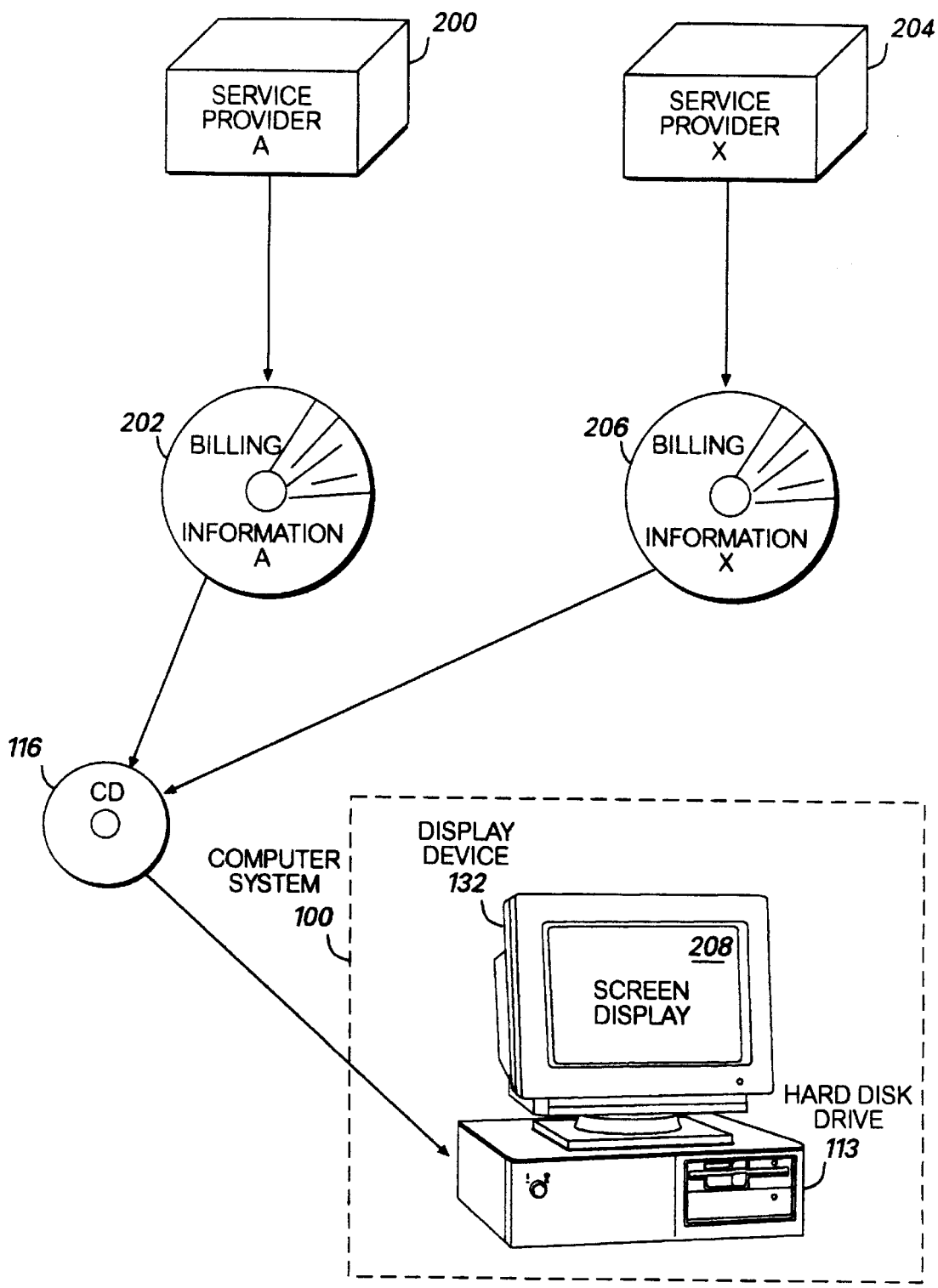
FIG. 2 is a diagram of a first embodiment of the present invention operating within the environment of FIG. 1.

FIG. 1 and the following discussion are intended to provide a brief, general description of a suitable computing environment in which the invention may be implemented. The invention is described in the general context of an application program that runs on an operating system in conjunction with a personal computer. Those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 100, including a processing unit 102, a system memory 104, and a system bus 106 that couples the system memory to the processing unit 102. The system memory 104 includes read only memory (ROM) 108 and random access memory (RAM) 109. The personal computer 100 further includes a hard disk drive 113, a magnetic disk drive 110, e.g., to read from or write to a removable disk 112, and an optical disk drive 114, e.g., for reading a CD-ROM disk 116 or to read from or write to other optical media. The hard disk drive 113, magnetic disk drive 110, and optical disk drive 114 are connected to the system bus 106 by interfaces 118. The drives and their associated computer-readable media provide nonvolatile storage for the personal computer 100. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 109. A user may enter commands and information into the personal computer 100 through a keyboard 128 and pointing device, such as a mouse 130. Other input devices (not shown) may include a microphone, joystick, game pad, satellite dish, scanner, or the like. These and other input devices are often connected to the processing unit via interfaces 118 that are coupled to the system bus. A display device 132 or other type of video output device is also connected to the system bus 106 via an interface, such as a video adapter 134. In addition to the display device 132, personal computers typically include other peripheral output devices (not shown), such as speakers or printers.

The personal computer 100 may operate in a networked environment using logical connections to one or more remote computers, such as a remote computer 136. The remote computer 136 may be a server, a router, a peer device or other common network node, and typically includes many or all of the elements described relative to the personal computer 100, although only a memory storage device 138 has been illustrated in FIG. 1. The logical connections depicted in FIG. 1 include a local area network (LAN) 140 and a wide area network (WAN) 142. Such networking environments are commonplace in offices, enterprise-wide computer networks, intranets and the Internet.

When used in a LAN networking environment, the personal computer 100 is connected to the LAN 140 through the interfaces 118. When used in a WAN networking environment, the personal computer 100 typically includes a modem 144 or other means for establishing communications over the WAN 142, such as the Internet. The modem 144, which may be internal or external, is connected to the system bus 106 via interfaces 118. In a networked environment, program modules depicted relative to the personal computer 100, or portions thereof, may be stored in the remote memory storage device. It will be appreciated that the network connections shown are exemplary and other means of establishing a communications link between the computers may be used.

In particular, an individual who uses the above described system may utilize the system and method of the present invention to associate information and/or services with elements of an organization if the particular information is provided in an electronically readable format. It will be understood that a wide variety of information may be associated in this manner, but billing information for telecommunications services will be used for illustrative purposes as one such type of information which may be associated with individual elements of an organization in accordance with the present invention.

Operation of the First Embodiment

A first implementation of the present invention provides information regarding the association of services itemized in an electronic telecommunications bill with elements of an organization that has used the telecommunication services itemized in the bill. Preferably, the system and method of the present invention associate elements of the organization with the services itemized on the telecommunications bill by displaying all information, both the hierarchical organization of the corporation's elements and the services list, on a computer monitor 132. This display of information is referred to as a "screen display." These screen displays commonly contain a single area in which all information is displayed, referred to as a "frame." Advantageously, the customer may review the information in the screen display in a top-down basis within a single frame, no matter what particular information is desired. This allows all information to be concisely and neatly presented. For example, a customer may review only the portion of a bill that is associated with one or more elements of an organization.

Different billing information for the same customer may be provided by different service providers. This billing information must be correlated with the specific elements of the customer's organization if it is to be correctly billed to the appropriate groups or elements within the corporation. Turning now to FIG. 2, in which like numbers represent like elements, service provider A 200 generates billing information A 202 for the customer. Likewise, service provider X 204 generates billing information X 206 for the same customer. Typically this billing information is encoded on a CD-ROM 116. Those skilled in the art will recognize alternative media for distributing billing information, including via diskette, electronic mail, optical disk, magnetic tape, and various other storage media. This is not intended to be a comprehensive list, but rather a sampling of available distribution methods.

Billing information A 202 and billing information X 206 are both sent to the customer. The billing information is then loaded into the customer's computer system 100, and locally stored on the hard disk drive 113. The customer may then activate the first embodiment of the present invention, which allows the customer to correlate the billing information 202 and 204, representing the use of services, with the appropriate elements of the customer's organization. The method of the present invention then displays the correlations within a screen display 208 on the display device 132, as is discussed in greater detail with respect to FIGS. 3 through 7.

The first embodiment of the present invention includes an advantageous function referred to as "drilling" that may be used in connection with screen displays of the present invention. With this "drilling" function, a customer may obtain more detailed associations of service information with elements of the organization by selecting the element for which detailed correlation of services is of interest. Another advantage of the drilling function is that the additional information obtained through the drilling function may be displayed on the same screen display as the original organizational hierarchy and services list. In addition, an advantage of the drilling function is that it allows for flexibility in the paths that are chosen with respect to obtaining more detailed correlation between elements of the organization and the services list. With the drilling function, the customer does not have to change screen displays to obtain further correlation information. The customer may choose a path for collecting more detailed information that is more appropriate to the issue of interest to the customer. Further, in this manner, the customer obtains detailed information with a minimum number of inputs, such as key strokes, mouse clicks, activations, etc.

In the first embodiment, the drilling function is provided as a tool for the customer's use in connection with a screen display to obtain further information about the electronic bill from the service provider. More particularly, the drilling function is provided as a tool for obtaining further information about "WHO/WHAT" issues related to the electronic bill. The "Who" refers to an element or elements of the customer's organization. The "What" refers to services or products from the service provider that are used within or may be charged to elements of the customer's organization.

Figure 3:
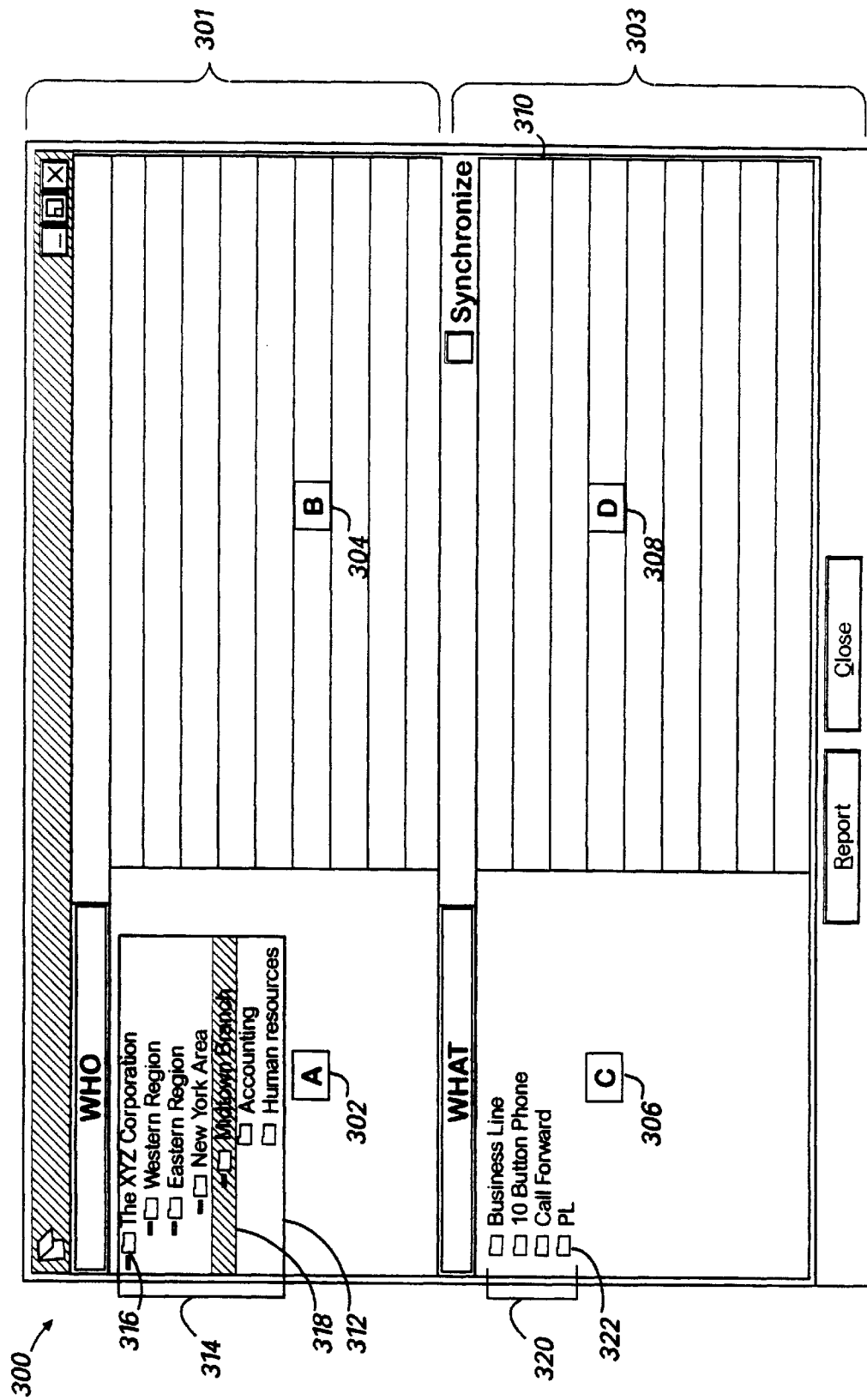
FIG. 3 is a diagram of a screen display showing the frame and subframes in accordance with the present invention.

Reference is made to an exemplary Who/What screen display 300 illustrated in FIG. 3. This Who/What screen display comprises a single frame 310, which is divided into quadrants A–D. The top quadrants, A & B, together comprise a "Who" subframe 301 and the bottom quadrants, C & D, together comprise a "What" subframe 303. In the upper-left-hand quadrant A 302 of the frame 310, the elements 316 of the customer's organization are displayed based on the organizational hierarchy 314 as provided by the customer.

The Who/What screen display 300, along with all other information displayed by the first embodiment of the present invention, takes place within a single frame 310.

The top-left quadrant A 302 includes an area for listing the elements 316 that make up the organizational hierarchy 314. This area, commonly referred to as a display space 312, is of a fixed size. If the organization includes more elements 316 than fit in the display space 312, then these elements may be scrolled through in this area in a manner well known to those skilled in the art. The display space 312 may further contain a blank area in the event that fewer elements 316 comprise the organizational hierarchy 314 than are necessary to completely fill the display space. It will be appreciated by those skilled in the art that an alternate embodiment of the present invention may allow the display space to expand or contract as necessary, within the physical limits of the display device 132 or other output device, in order to accommodate the length of the organizational hierarchy 314 as defined by the number of elements 316 comprising it. As a customer moves through the organizational hierarchy 314 from its highest elements through its lower elements, the customer is using the drilling function to obtain more information about the elements of the organization, i.e., the "Who".

To view the charges for the services 322 assigned to any particular element of the customer's organization, the customer may click-on or otherwise activate the particular organizational element 316 of interest in the screen display in the upper left hand quadrant 302. A user of the method of the present invention activates the particular element 316 through the use of a mouse 130 (see FIG. 1), keyboard 128 (see FIG. 1), or other similar input device. An organizational element that has been activated in this fashion is referred to as a selected element 318. This activation by the user generates a signal instructing the Who/What screen display 300 to display the charges for the services 322 assigned to the selected element 318. Alternately, a service 322 may be activated; in that case the Who/What screen display 300 would display all services 322 from the services list 320 that comprise the selected service, along with the individual costs of the services to the organization as a whole.

Referring to the top-right quadrant B 304, this area produces a dynamic display of information corresponding to a selected element 318 appearing in quadrant A 302. Referring to the bottom-left quadrant C 306, this area produces a display of categories of services or products for which billed items may appear on the electronic bill. These categories may also be organized pursuant to a hierarchy, referred to as a services list 320. As the customer moves through the services list 320 from the highest level in the list to the lowest level in the list, the customer is using the drilling function to obtain more information about the services or products, i.e., the "What". Referring to the bottom-right quadrant D 308, this area produces a dynamic display of information corresponding to a category selected in quadrant C 306.

Advantageously, the method of the present invention provides that the Who/What screen display 300 may be used in connection with the drilling function in at least three different ways by the customer. First, the customer may drill through the "Who" quadrants 302 and 304 to obtain further information. Second, the customer may drill through the "What" quadrants 306 and 308 to obtain further information. And third, the customer may synchronize the "Who" quadrants 302 and 304 with the "What" quadrants 306 and 308 in order to obtain, in a most flexible fashion, information that crosses the Who/What boundary. In other words, synchronization of the Who/What quadrants 302, 304, 306, and 308 results in a coordination of information across the Who/What boundary.

As can be seen in FIG. 3, the organizational hierarchy 314 of elements 316 is visually communicated through the use of a system of indentations. In this system of indentations, elements 316 which share a common indentation in the list also share a common level in the hierarchy. Elements 316 which are classified as belonging to a particular higher element in the hierarchical list are grouped together in order to illustrate this classification.

Figure 4:
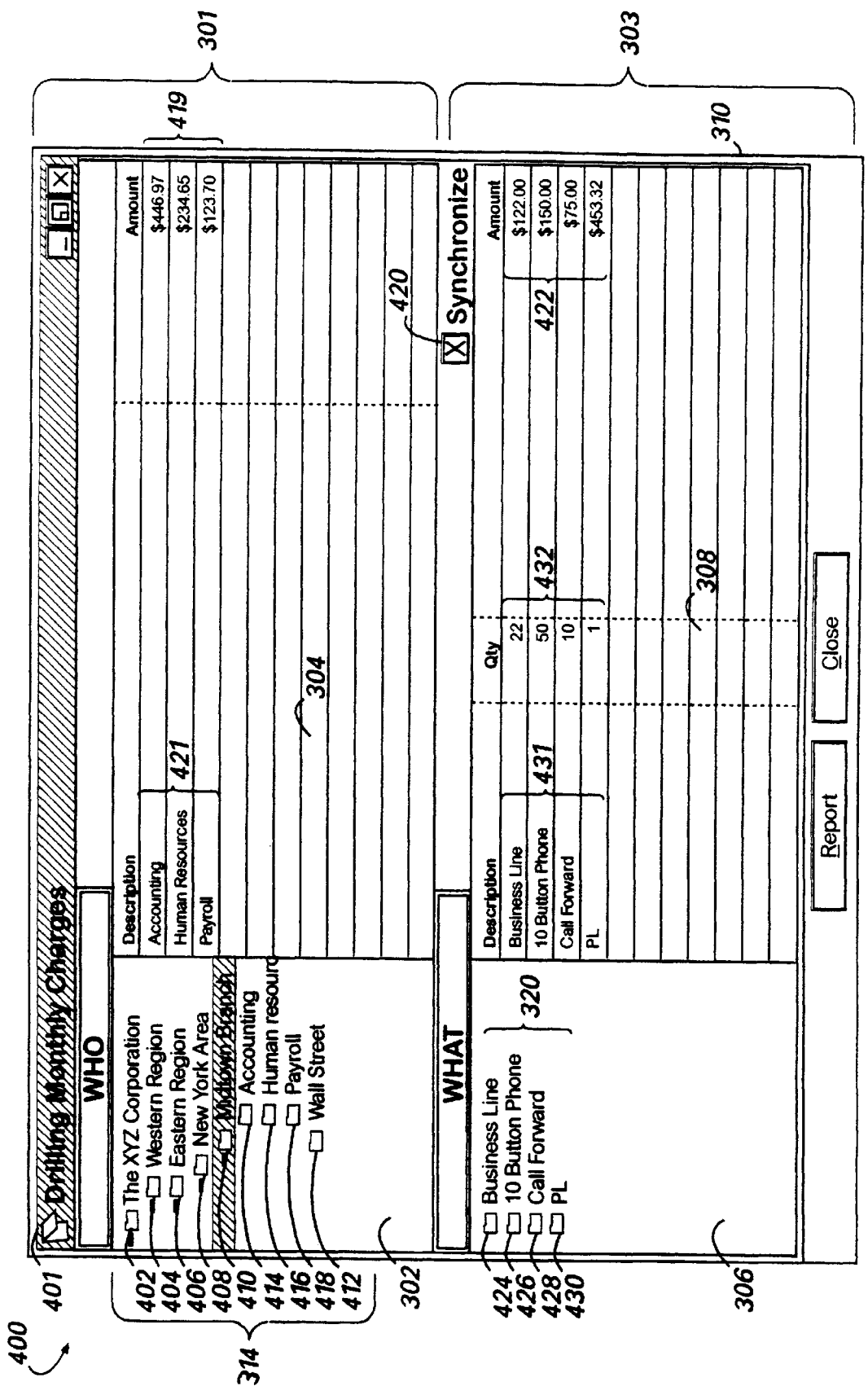
FIG. 4 is a diagram of a screen display of FIG. 3 showing typical data.

An exemplary Who/What screen display 400 that results from the method of the present invention is shown in FIG. 4. As indicated in the header 401 of the exemplary Who/What screen display 400, this screen display may be used in connection with drilling for information related to the category of monthly charges with respect to a services list 320 in an electronic bill. In this example, top-left quadrant A 302 includes an organizational hierarchy 314 comprised of the elements 316 (See FIG. 3) of the XYZ Corporation 402. As illustrated, the highest level element, the XYZ Corporation 402, includes the elements of a Western Region 404 and an Eastern Region 406 which are of the same level in the hierarchy. The Eastern Region 406 includes the New York Area 408 as an element. Further, the New York Area element 408 includes an exemplary Midtown Branch element 410 and a Wall Street element 412 which are of the same level in the hierarchy. In addition, the Midtown Branch element 410 includes the exemplary elements of Accounting 414, Human Resources 416, and Payroll 418 which are of the same level in the hierarchy. Thus, in FIG. 4, the organizational hierarchy 314 of the XYZ Corporation 402 includes nine elements 316 (FIG. 3) grouped into five different levels.

Similarly, FIG. 4 shows the hierarchical structure of the services list 320 located in lower-left quadrant C 306. In this example, the services (labeled generically as 322 in FIG. 3) which comprise the services list 320 include: Business Line 424; 10-Button Phone 426; Call Forward 428; and PL 430. These services, 424–430 illustrate the categories of services (or products) 322 for which the elements 402–418 in top-right quadrant A 302 may be billed or charged.

Still referring to FIG. 4, as shown by the highlighting in top-left quadrant A 302, a customer using this screen display has selected the exemplary Midtown Branch element 410. In response to this selection, information about the XYZ Corporation, and in particular, about the Midtown Branch is displayed in top-right quadrant B 304. Quadrant B 304 includes a description entry 421 for each of the elements that are classified as belonging to the Midtown Branch element 410, to-wit: the Accounting element 414, the Human Resources element 416, and the Payroll element 418 (for ease of communication these elements will hereinafter be referred to simply as "Accounting", "Human Resources" and "Payroll".) Further, quadrant B 304 includes monetary amounts 419 that represent the total charges 422, shown in quadrant D 308, that have been assigned respectively to each of the elements 402–418 relating to the services 424–430 under review. Thus, a customer reviewing the Who/What screen display 400 is provided with the following information: the charges 422 shown in quadrant D 308, for services 424–430 included in quadrant C 306, which are to be allocated to the Midtown Branch element 410 selected in quadrant A 302, are shown as amounts 419 in quadrant B 304 to be distributed amongst Accounting 414 ($446.97), Human Resources 416 (234.65), and Payroll 418 ($123.70).

Still referring to the exemplary Who/What screen display 400, it is noted that the customer has activated the synchronize function of this screen display so that the Who quadrants 302 and 304 are synchronized to the What quadrants 306 and 308. This activation may be accomplished in any manner known to those skilled in the art. As illustrated, the Who/What screen display 400 includes a box labeled "Synchronize" 420 which the customer may click on, or otherwise activate, to activate the synchronize function. When the box 420 is "checked" then the synchronize function is active, and when the box is "not checked" then the synchronize function is inactive.

As mentioned, FIG. 4 illustrates an exemplary Who/What screen display with the synchronization function activated. Lower-right quadrant D 308 includes a description entry for each of the services 424–430 of lower-left quadrant C 306. Further, each of the entries in quadrant D 308 includes a quantity FIG. 432 and a monetary amount 422 that represents the total charges for the particular category of service 424–430. Thus, a customer reviewing quadrant D 308 of the Who/What screen 400 is provided with the following information: the charges to the Midtown Branch element 410 are based on twenty-two business lines at $122.00, fifty 10 button phones at $150, ten call forwards at $75.00, and one PL at $458.32. It will be appreciated that the sum of the charges 419 in quadrant B 304, as assigned to the Accounting 414, Human Resources 416, and Payroll 418 elements, is equal to the sum of the charges 422 in quadrant D 308, as distributed among the business lines, 10 button phones, call forward and PL.

As a further example, assume that a customer is interested in obtaining additional information (i.e., drilling) with respect to the business lines 424 that are charged to the exemplary Midtown Branch element 410. The customer could activate the business line category in lower-left quadrant C 306 of the Who/What screen display 400. If the customer were to do so, lower-right quadrant D 308 then would change to display a listing of all of the services from the services list 320 that comprise the Business Line selected service, along with the charges for each. If the customer retains the synchronize function, then as a further response to the activation of the business line category in lower-left quadrant C 306, the information in upper-right quadrant B 304 would change to correspond to the information in quadrants C 306 and D 308. Specifically, all elements 402–418 which employ the selected Business Line service would be displayed in upper-right quadrant B 304, along with the total cost for the selected service charged to each element.

As noted above, the Who/What screen display 400 is illustrative. In one embodiment, the Who/What screen display changes depending on the type of information that is categorized, queried, etc. For example, the What quadrants C 306 and D 308 may display different types of information based on the different major categories of an electronic bill. With respect to quadrant C 306, if the category of monthly charges or of other charges and credits are being reviewed, then a list of the stations, universal service order codes (USOCs) or other list may be produced. Also with respect to quadrant C 306, if the category is usage, then a hierarchy of information including the provider, the call method and the call type may be listed.

With respect to quadrant D 308, if a review is conducted of the category of monthly charges, the category of one time charges, or the category of other charges and credits, then the display in quadrant D 308 depends on whether a selection has been made from quadrant C 306. If no selection has been made in quadrant C 306, then a summary of the categories that could appear in quadrant C 306 may be displayed in quadrant D 308. For example, assume quadrant C 306 displays a list of universal service order codes (USOCs), but no USOC is selected in quadrant C 306. Then, a summary by USOC is displayed in quadrant D 308. For another example, reference is made to the exemplary Who/What display 400 of FIG. 4 wherein the display in quadrant D 308 matches the display in quadrant C 306 on the basis that no selection had been made in quadrant C 306. On the other hand, if a selection has been made in quadrant C 306, then the respective items corresponding to the selection are displayed in quadrant D 308.

Still with respect to quadrant D 308, more particular explanation is provided with respect to the exemplary Who/What screen display 400 illustrated in FIG. 4. If a review is conducted of the category of usage, then lower-right quadrant D 308 may display total charges applicable to the selection made from lower-left quadrant C 306. If no selection has been made from quadrant C 306, then a summary by service provider may be displayed in quadrant D 308. If a provider is selected from lower-left quadrant C 306, then a summary by call method for that selected service provider may be displayed in lower-right quadrant D 308. If a call method is selected from quadrant C 306, then a summary by call type for that selected call method may be displayed in quadrant D 308. Further, if a call type is selected from lower-left quadrant C 306, then a listing of all calls may be displayed in lower-right quadrantD 308.

Figure 5:
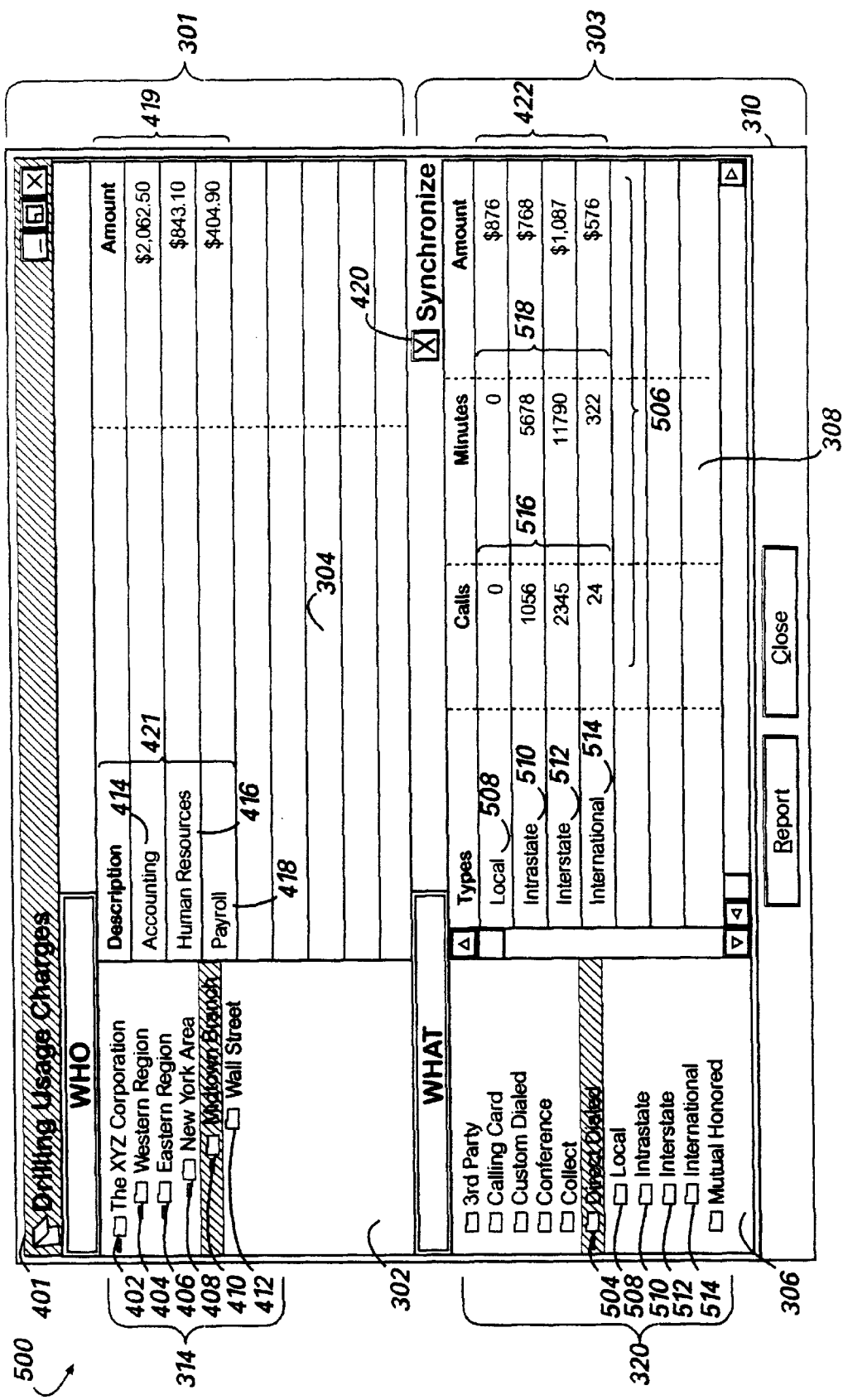
FIG. 5 is a diagram of a screen display of a second embodiment of the present invention.

One embodiment of the present invention is further operative to allow the selection of both a selected element and a selected service. For example, FIG. 5 shows both a selected element 410 and a selected service 504 within an exemplary Who/What screen display 500. In response to the activation of a selected element 410 from quadrant A 302, all elements 414–418 comprising the selected element 410 are displayed in quadrant B 304 along with the total charges 419 applicable to each element 414–418, respectively. In the Who/What screen display 500, the Midtown Branch element is the selected element 410, and the Accounting 414, Human Resources 416, and Payroll 418 elements are displayed in quadrant B 304.

Similarly, in response to the activation of a selected service 504, the individual services 508–514 which comprise the selected service 504 are displayed in quadrant D 308. Also displayed in quadrant D are any data 506 relevant to the displayed services 508–514, which may vary from service to service. In the present example, the selected service 504 is the Direct Dialed service. The Local 508, Intrastate 510, Interstate 512, and International services 514 together comprise the selected service 504, and are thus displayed in quadrant D 308. To continue with this example, additional data 506 displayed in quadrant D 308, namely Calls 516, Minutes 518, and Amount 422. It will be appreciated by those skilled in the art that the relevant data, if any, is dependent on the specific services 322 (FIG. 3) in the services list 320. For example, if the service 322 is "tennis games" then the data 506 might be "sets", "score", "faults", and "total serves." Other examples will occur to those skilled in the art without deelementing from the spirit and breadth of the claims.

An alternate embodiment of the present invention may have two separate Synchronize boxes, namely, "Synchronize to WHAT" and "Synchronize to WHO." Separate synchronize boxes advantageously allows the synchronization of data in only one direction across the Who/What boundary. That is, if only a single synchronize box is checked, then selecting a service or element from the subframe corresponding to the synchronize box will cause information to be synchronized across the Who/What boundary, but the selection of a service or element from the other subframe does not cause this synchronization. Additionally, if a service or element is selected in the other subframe, then it acts as a limiter on the hierarchical level of the information or elements displayed in response to this synchronization. This limitation prevents the display of information or elements in response to the selection while a synchronization box is checked of a higher hierarchical level or which are ranked below one that is not expanded. In an alternate embodiment, elements and services in an organizational hierarchy or services list are contained within those elements or services higher in the hierarchy. Elements or services are designated as "open" or "closed" by a user of an alternate embodiment. If an element or service is open, then any subelements or subservices of the open element or service are displayed. If an element or service is closed, then no subelements or subservices are displayed. Put simply, no elements above the selected element nor any subelements below a closed subelement will be displayed in response to a selected service, even if the "Synchronize to WHAT" box is checked. The same is true for services when the "Synchronize to WHO" box is checked.

Figure 6:
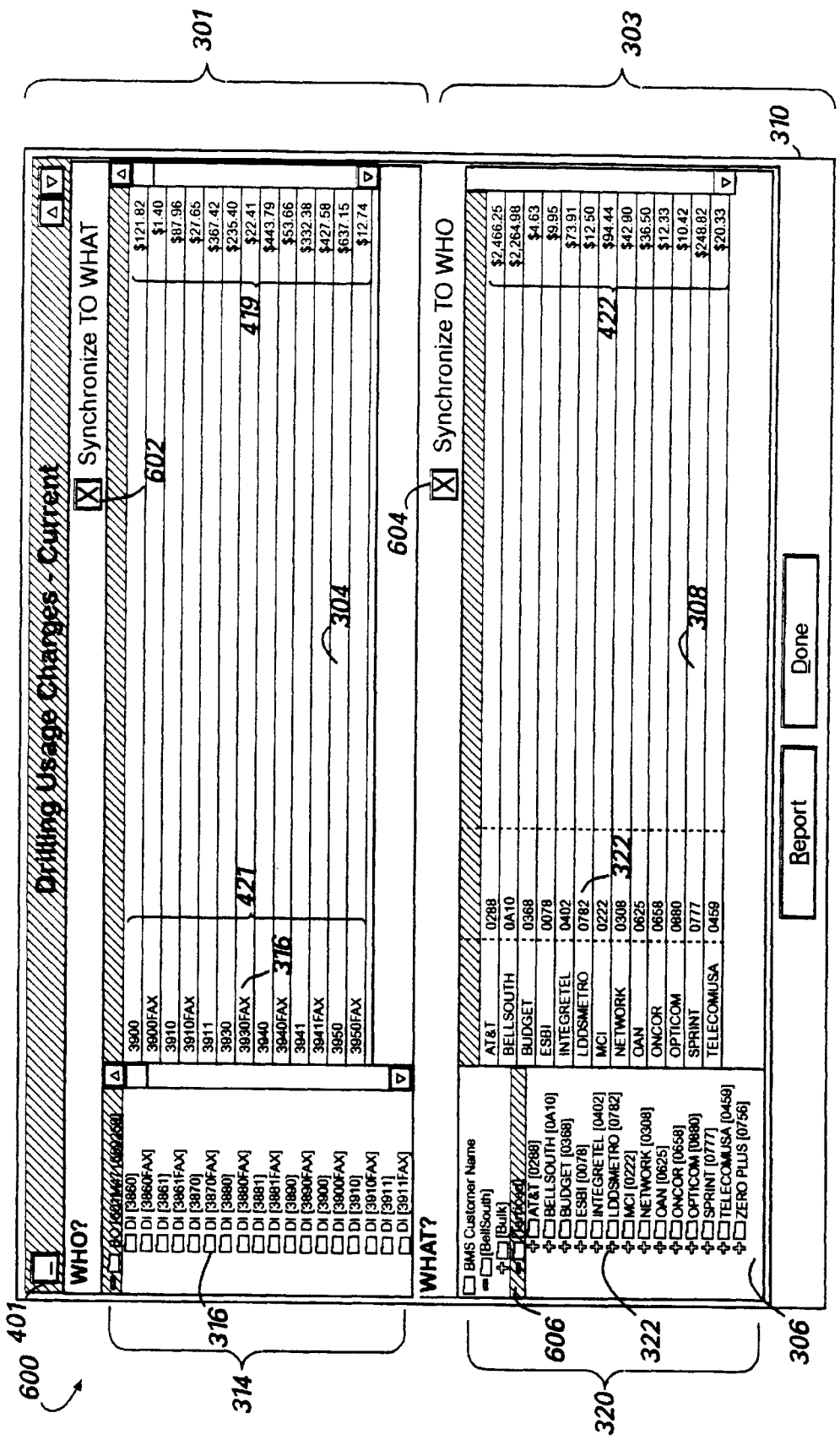
FIG. 6 is yet another diagram of a screen display of the second embodiment of the present invention.

An example of this alternate embodiment is given in FIG. 6, wherein a Who/What screen display 600 is shown having a "Synchronize to WHAT" box 602 and a "Synchronize to WHO" box 604, as opposed to the single "Synchronize" box 420 shown in FIG. 4. The selection of selected element 606 "Itemized" in quadrant C 306 causes this alternate embodiment to display in quadrant D 308 all services 322 from services list 320 comprising the selected service 606, along with the total charges 422 for each service. Further, because the "Synchronize to WHAT" box 602 is checked, this alternate embodiment displays in the description entry 421 of quadrant B 304 all elements 316 that employ the selected service 606, along with the total charges 419 for the selected service 606 incurred by each element 316 displayed. Because the selected element 608 in quadrant A 302 is the topmost element 316 in the organizational hierarchy 314, the only limitation on what elements are displayed in quadrant B 304 in response to the selection of the Itemized service 606 is that only open elements of the organizational hierarchy are displayed. Thus, checking the "Synchronize to WHAT" box 602 causes information to be synchronized across the Who/What boundary only if a service 322 is selected from the services list 320.

Figure 7:
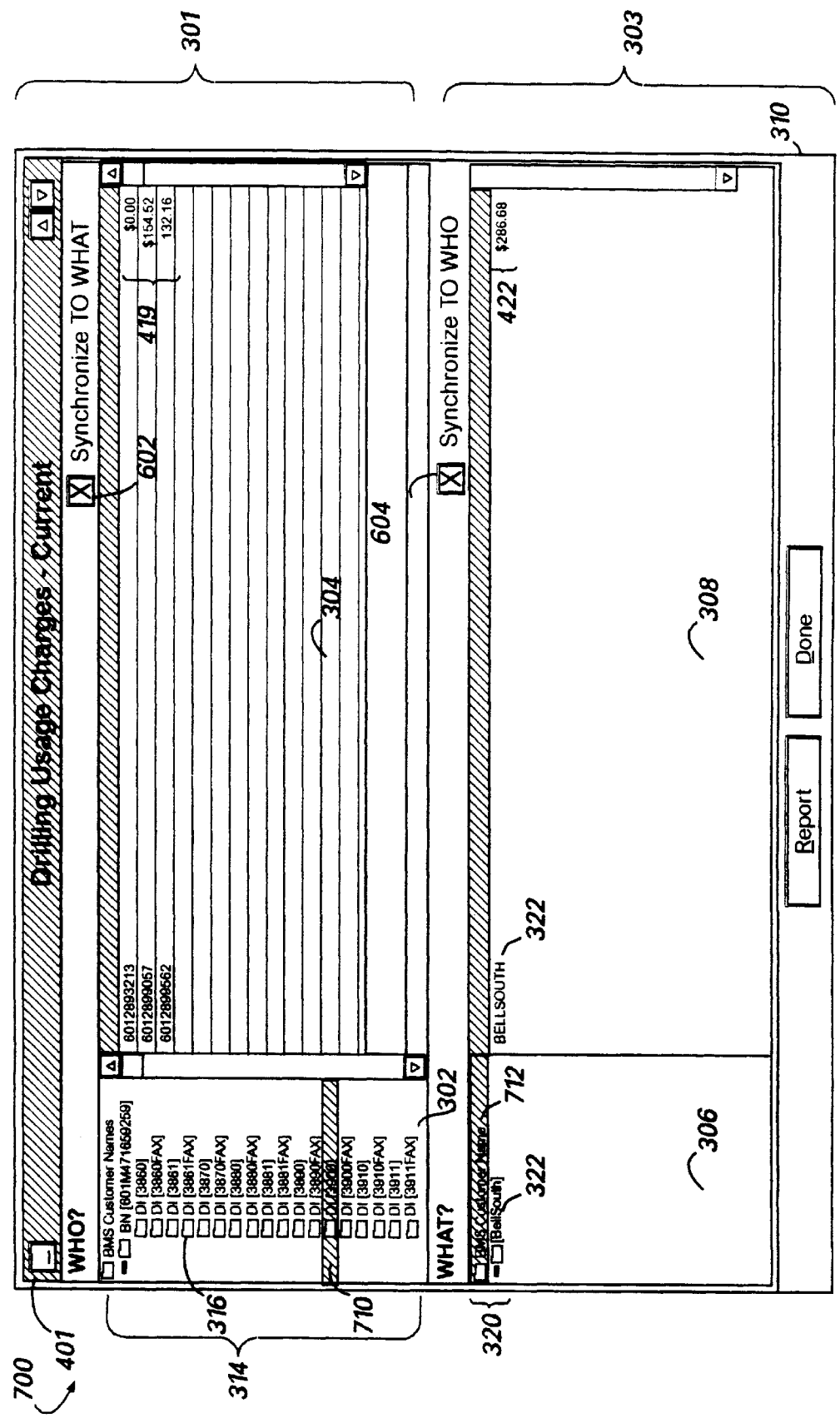
FIG. 7 is a diagram of a screen display showing of the second embodiment of the present invention.
Figure 8:
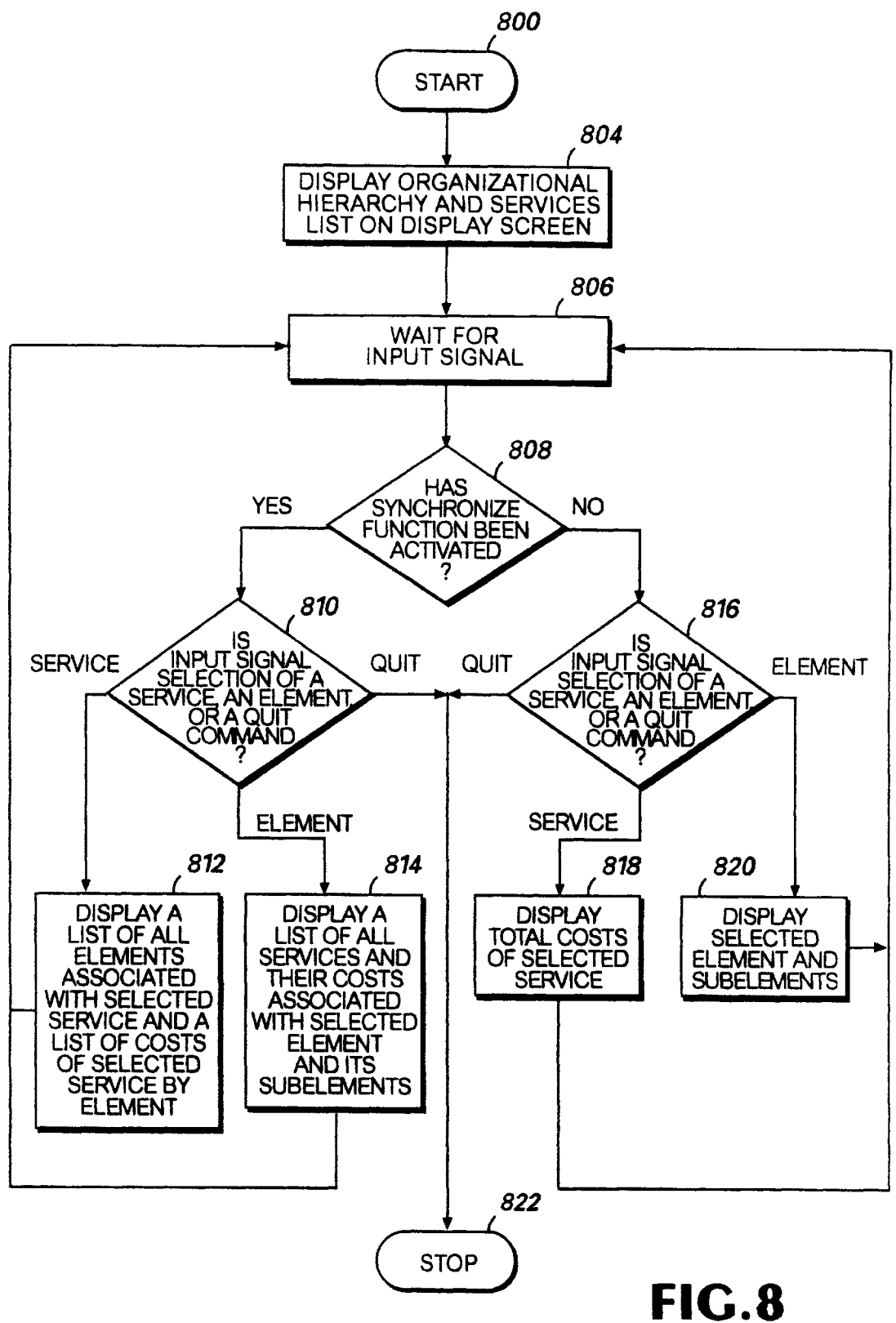
FIG. 8 is a flowchart detailing the operation of the present invention.

A similar example is provided in the exemplary Who/What screen display 700 of FIG. 7. The Who/What screen display 700 includes both a "Synchronize to WHAT" box 602 and a "Synchronize to WHO" box 604. In this example, the "Synchronize to WHO" box 604 is checked, activating synchronization of the "What" subframe 303 to the "Who" subframe 301. That is, the information displayed in the "What" subframe 303 by an alternate embodiment is dependent on the information displayed in the "Who" subframe 301. Referring further to FIG. 7, the element DI (3900) 710 is selected. In response to this selection, an alternate embodiment of the present invention displays a description entry 421, in quadrant B 304, of all elements 316 from the organizational hierarchy 314, which comprise the selected element DI (3900) 710, along with all costs 419 incurred by these elements. Further, because the "Synchronize to WHO" box 604 is checked, an alternate embodiment displays in quadrant D 308 the services 322 from the services list 320, that are associated with the selected element DI (3900) 710. As previously stated, the services 322 displayed are limited by both their position in the services list 320 with respect to selected service 712 and whether services lower in the services list hierarchy than the selected service are open. In the exemplary Who/What screen display 700, the only service displayed in lower-right quadrant D 308 is the BellSouth service.

As those skilled in the art will understand, the Who/What screen displays may be used to provide information as appropriate to the particular organization and its elements, and to the particular categories of services and products that may be charged to the organization or to the elements thereof. An effort has been made herein to provide an exemplary description of types of information or presentations that may be displayed on an exemplary Who/What screen display. Other types of information or presentations will occur to those of skill in the art.

As an example of another type of information that may be displayed, it has also been contemplated that the present invention will provide the customer with the ability to view any deviation in the particular electronic bill from any designated bill in the database. This deviation may be shown in percentages or in other ways. If the deviation is of a preselected size, then the deviation may be highlighted, may be of a certain color or may be otherwise made to stand out against other displayed information. Preferably, the customer may specify an acceptable preselected size or percentage deviation of the particular electronic bill from the designated bill. This specification may be made for the following categories: (1) Monthly Charges; (2) Other Charges & Credits; and (3) Usage.

FIG. 8 shows a flowchart detailing the operation of one embodiment of the system. From start step 800, both an organizational hierarchy 314 and services list 320 are displayed on a display device 132 in step 804. Once these have been displayed, step 806 requires an input signal. Upon receipt of an input signal, step 808 asks whether or not the "Synchronize" option has been selected.

If the "Synchronize" function has been activated by checking the "Synchronize" box 420, then step 810 is executed wherein the determination is made if the input signal represents the selection of a service, an element, or a quit command. In the event that the input signal represents selection of a service, the step 812 is executed, displaying a list of all elements 316 (FIG. 3) associated with the selected service 504 (FIG. 5), as well as a list of the costs 422 (FIG. 4) of the selected service broken down by individual element. Once the list has been shown on the display device 132, step 806 is returned to in order to wait for another input signal. In the event that an element was selected in step 810, step 814 is next performed. Step 814 dictates that a list of all services 322 (FIG. 3), and their respective costs 422 (FIG. 4), associated with the selected element 318 (FIG. 3) and any of its subelements be displayed. Once the information on the display device 132 is updated, step 806 is returned to in order to wait for another input signal.

Alternately the "Synchronize" box 420 (FIG. 4) may not be checked. In this case, step 816 is performed after step 808 rather than step 810 as detailed previously. In step 816, the input signal is examined in order to determine whether it represents selection of a service, an element, or a quit command.

If the input signal represents selection of a service 322 (FIG. 4), then the system executes step 818, displaying on the display device 132 the total costs 422 (FIG. 4) of the selected service 504 (FIG. 5) incurred by the organization. Upon execution of step 818, step 806 is returned to in order to wait for another input signal.

If the input signal examined by the system in step 816 represents instead the selection of an element, then step 820 is executed. In step 820, the selected element 318 (FIG. 3) and any subelements are displayed. After the necessary information is displayed on the display device 132, step 806 is once again checked for the presence of an input signal.

If, in either step 810 or step 816 it is determined that the input signal represents a quit command, step 822 is immediately proceeded to and the process ends.

In sum, the invention provides a system and method for associating information with elements of an organization. Advantageously, this allows a customer the ability to easily correlate services or products with specific elements of an organization with the speed and flexibility associated with a computer. It further advantageously eliminates the necessity for people to sit down with pencil and paper and draw these associations manually. An additional advantage of the current invention is the ability to correlate information that stems from multiple disparate sources.

While this invention has been described in detail with particular reference to alternate embodiments thereof, it will be understood that variations, modifications and other alternate embodiments can be effected within the spirit and scope of the invention, as described herein and as defined in the appended claims.

It should be noted that the above-described method and system for associating services information with selected elements of an organization has the capability of comprising a component of an integrated billing analysis and management system, that is also within the contemplation of the present invention. Additional advantageous features of such a billing analysis and management system are described in greater detail hereinafter.

General Overview of the Exemplary Embodiments of the Methods and Systems for Billing Analysis and Management One embodiment of the billing analysis and management system reads, translates, decompresses and loads billing information from a plurality of electronic bills from service providers into a billing information database or other storage medium. Advantageously, the loading of billing information from a plurality of electronic bills into a billing information database provides the customer with a single repository of information relating to these electronic bills.

Further, the billing analysis and management system includes a plurality of features and functions that may be used in connection with the billing information stored in the billing information database. Advantageously, a customer may use an exemplary embodiment of the billing analysis and management system to load the billing information from electronic bills into an element of the customer's computer system or associated or connected storage medium. The customer then may review the billing information from the electronic bills on computer screen displays. The customer may also make queries and receive responses thereto with respect to the billing information. These advantages provide the customer with the further advantage in the ability to use the system to verify that billing information is accurate. Further, the customer may view the billing information in the form of graphs or charts on screen displays, or in the form of a printed bill displayed on a screen display. In addition, the customer may use the billing information to maintain a budget and to rebill the billed items or charges to other elements or members of the customer's organization. Yet another advantage of the present billing analysis and management system is that the customer may conduct administrative functions with respect to the system and may generate reports based on the billing information.

Throughout this description, an exemplary embodiment of the present invention may be described in the context of electronic bills for telecommunication services or products that are provided to a customer by one or more telecommunication service providers. Thus, the exemplary databases, tables, fields of information, screen displays and other examples used to describe an exemplary embodiment of the present invention may reference or include information peculiar to telecommunication services or products. Yet, the present invention should not be limited to the field of telecommunications. Those skilled in the art will understand that billing information from other types of service providers or vendors may be used in connection with the present invention to the advantage of the customer who uses the present invention. For example, a customer may receive electronic billing information from a plurality of electric utility companies and may use the present invention to analyze and manage the billed items and charges from these utilities. As another example, a customer may receive electronic billing information from a plurality of stationery and office supply companies and may use the present invention to analyze and manage the billed items and charges for the goods provided by these stationery and office supplies. Other examples to which the present invention may be put will occur to those skilled in the art.

Overview of an Exemplary Billing Analysis and Management System

The billing analysis and management system of the present invention reads, translates, decompresses and loads billing information from a plurality of electronic bills from service providers into a relational database, which is referred to herein as a billing information database. In one embodiment, the billing information database is part of or is connected to or associated with a customer's computer system such as a personal computer as described above in connection with FIG. 1. For example, FIG. 2 illustrates that a service provider A may provide billing information A in the form of computer-readable media such as a disk or a CD-ROM disk to a customer. The customer then may use the billing analysis and management system to read, translate and load the billing information from the computer-readable media to an element of or associated with the customer's computer system, and in particular to the billing information database. FIG. 2 further illustrates that the present system allows for a plurality of service providers to provide respective billing information to the customer's computer system. As illustrated, service provider X may provide billing information X to the customer, which then may use the system to read, translate and load the billing information into the billing information database. The ellipses (". . . ") between service provider A and service provider X, and between billing information A and billing information X, indicate that a plurality of billing information may be received from a respective plurality of service providers. Of course, a plurality of billing information may be received by the customer from a single service provider. A service provider may also be referred to herein as a vendor.

As described herein, the billing analysis and management system, its functions, features and other elements are often described with reference to "an electronic bill". The use of the singular with respect to "electronic bill" is for sake of simplicity. It will be understood that the billing information from a plurality of electronic bills may be received, read, decompressed, translated and loaded into the billing information database and its inclusive databases, tables and files. The billing information from these plurality of bills may be compiled, added, summarized, etc. and used in connection with the present system such that a customer may analyze and manage its total charges and billed items from all of the plurality of service providers that provide electronic bills. In accordance with the description of this system, this analysis and management by the customer may be conducted in summary fashion with regard to all service providers, all billing information, all electronic bills, etc., or may be conducted in selectable piecemeal fashion with regard to the charges of any particular service provider, any particular segment of billing information, particular electronic bills, etc.

FIG. 2 further indicates that the exemplary billing analysis and management system may provide certain functions and features that may be used by the customer in connection with the billing information stored in the billing information database. For example, these features and functions may allow the customer to analyze and manage the billing information through the use of the customer's computer's screen display and input device(s). These functions and features are explained in detail below.

One embodiment of the billing analysis and management system may be implemented as a multi-user, windows-based application or program which is capable of running in an operating environment such as may be provided by the following: Windows 3.1 (or higher), Windows 95 or Windows NT, Microsoft Corporation, Redmond, Wash., operating environment. Also, the exemplary embodiment may be used in connection with a platform that also runs the following software programs: Microsoft Excel, Microsoft Word, or Microsoft Access, Microsoft Corporation, Redmond, Wash. In addition, this exemplary embodiment is capable of supporting data storage using software programs or applications such as the following: Microsoft Access, Microsoft SQL, Oracle, or SyBase, or other data management software. The general performance standards for the exemplary system are based on the following computer system configuration: CPU: 486 66 Mhz; 8 Mbytes RAM; and 10 Mbytes storage for application programs and files.

Also, it will be of interest to the reader that the exemplary billing analysis and management system is developed based on Visual Basic 4.0. The database may be a database based on Microsoft Access database and powered by the Jet engine. Also, each Access database may be presented as a single file to the operating system of the customer's computer. In addition, it is contemplated that the databases used in connection with the present invention be kept compressed so that storage requirements on the customer's computer system are minimized. The construction of the relational billing information database, and in particular, the tables of the billing information database are described below.

Advantageously, the billing analysis and management system provides that changes in screen displays do not take longer than two seconds. If a feature or function is to take more than five seconds to implement, then the system may provide the user with a visual indication or graphic representation on the screen display of the percentage work left to be completed with respect to the feature or function. If a feature or function is to take more than a preselected number of minutes to implement, then the system may provide the user with a visual indication of the number of minutes involved. The system also may provide the user with an option to continue or to discontinue implementation of the particular feature or function. Another advantage of the system is that it provides a user with features such as Print or Help throughout each of the features, functions and screen displays used by the customer. Further, the system provides context sensitive Help features in connection with the features, functions and screen displays used by the customer. In addition, fields of information may be edited as the information is input therein, and messages boxes may be provided to detail error conditions and corrective actions. One embodiment of the billing analysis and management system uses a consistent color palette in connection with its screen displays.

1. Generation and Installation of Computer-Readable Distribution Media Containing Billing Information As explained generally above, billing information is provided periodically to the customer for use with the present invention. BY way of example, billing information from the respective telecommunications service providers that serve the customer is provided to the customer in an electronic bill via a type of computer-readable distribution media that may be specified by the customer. For example, the customer may specify that the distribution media be provided in the form of a CD-ROM disk or a magnetic disk(s) (also referred to herein as a diskette(s)). In whatever form it is provided, pursuant to the present invention, this billing information may be built or loaded into the tables of a relational database that is referred to herein as the "billing information database". The billing information in the billing information database is used by the billing analysis and management method and system of the present invention.

As noted, a customer may receive billing information in a customer selected electronic format from several different service providers. One of these service providers may also be the licensor or other source of the billing analysis and management system. For example, service provider "A" may license an embodiment of the present invention to the customer. When a service provider to the customer is also the entity that is the licensor or other source of the billing analysis and management system, then the customer may receive information in addition to the billing information from this service provider. This additional information may include distribution and other files and may concern the installation, operation and/or maintenance of the billing analysis and management system. Also, this additional information may relate to the reading, translation, decompression or loading of the billing information. Further, this additional information may have to be read, translated and/or loaded to the customer's system prior to the reading, translation, decompression and/or loading of the billing information from that service provider.

The general process for the generation of computer-readable distribution media containing billing information for a customer is now described in the context of telecommunications service provider "A". In this example, service provider "A" is also the licensor or other source of the billing analysis and management system to the customer. Of course, the billing information may be obtained from other sources and in other formats as will occur to those skilled in the art. As a first step in this process, the service provider "A" assembles the billing information for the customer into a single file. If necessary, the billing information is converted to ASCII (American Standard Code for Information Interchange) format and validated. The billing information is generally provided in a compressed format.

Prior to reading the billing information from the disk(s) to its computer system, a customer may have to read, translate and load (and possibly decompress) the additional information such as the distribution and other files that may have been included with the billing information to the customer's computer system. The customer then reads, translates, decompresses and loads (all as necessary) the billing information to the customer's computer system, and thus, to the billing analysis and management system stored on the customer's computer. In one embodiment, the decompression routine is provided as a dynamic link library (DLL). In other words, the DLL may be used to read records from the billing information database. In response to a call, the DLL returns a decompressed record, as appropriate, from the billing information file.

Whether a CD-ROM disk, magnetic disk(s) or other distribution media are used, the loading of the billing information into the billing information database occurs in two phases. These phases are discussed below in connection with the Load Bills feature of an exemplary embodiment of the billing analysis and management system.

2. Overview of the Features and Functions of an Exemplary Billing Analysis and Management System Exemplary embodiments of the billing analysis and management method and system of the present invention may include several features, and each of these feature may include additional functions. These features may include (A) Load Bills;; (B) Query; (C) Invoice; (D)Exceptions; (E) Graphs; (F) Bill Image; (G) Budget; (H) Administration; and (I) Report. Illustrative embodiments of each of these features and their respective functions are generally described below.

A. Load Bills feature

As noted, the billing analysis and management system of the present invention reads, translates, decompresses and loads the billing information from one or more electronic bills from service providers into a billing information database. The Load Bills feature of the billing analysis and management system is used to accomplish this reading, translating and decompressing of the billing information from an electronic bill. Further, the Load Bills feature is used to load or map the billing information from the electronic bill into the files or tables of the billing information database. Advantageously, the loading of billing information from a plurality of electronic bills into the billing information database provides the customer with a single repository of billing information relating to these electronic bills.

As a further advantage, in connection with the Load Bills feature, an exemplary embodiment provides the customer with a reminder that certain steps may need to be taken prior to loading an electronic bill into the billing information database. This reminder may be displayed on one or more screen displays that are used in connection with the Load Bills feature. For example, the distribution media containing the electronic bill of a particular service provider may also include certain information such as distribution and other files that must be installed prior to the loading of the electronic bill that is also present on the distribution media. Thus, the Load Bills feature provides the customer with this reminder. As a further advantage, the Load Bills feature allows the customer to take or to invoke the requisite steps prior to loading the electronic bill into the billing information database. For example, the customer may invoke these requisite steps directly from the screen displays that are used in connection with the Load Bills feature. In this manner, the customer does not have to backtrack to other screen displays, to take additional steps, or to move to other places in the billing analysis and management system in order to accomplish its purpose in loading the electronic bill into the billing information database.

When the Load Bills feature is invoked, the customer must choose which electronic bill to load into the billing information database. This choice may be made based on any of several characteristics of a particular electronic bill. For example, this choice may be made on the basis of the identity of the service provider or vendor, on the date of the electronic bill, etc. Once the customer has chosen an electronic bill to load and has invoked the load process, the Load Bills feature checks whether the chosen electronic bill has already been loaded. For example, prior to loading a particular electronic bill, the Load Bills feature may check if another electronic bill with the same bill number and/or invoice date has been already loaded. If so, advantageously, the Load Bills feature may provide the customer with certain options. These options may include erasing the particular electronic bill, erasing the information relating to that particular electronic bill from the billing information database, or quitting the process of loading this particular electronic bill. Other options will occur to those skilled in the art.

The Load Bills feature includes a process that loads the billing information from the electronic bill in two phases. In the first phase (Phase I Load), the billing information from the electronic bill is read, decompressed, translated and populated in the billing information database. Also in the first phase, tables such as cross-reference tables may be generated or completed from certain elements of the billing information in the electronic bill. These elements may include billed items or charges. A "billed item" is an item such as a service or product for which the customer is charged or billed by the service provider. One of the tables that may be generated or completed during Phase I is a Billed Items table or list. A Billed Items table typically includes a plurality of records or entries corresponding to billed items that may appear or that have previously appeared on an electronic bill. Each entry in the Billed Items table may have two related parts: (1) a billed item; and/or (2) a department identifier (DI) code which is associated or related to the billed item in the entry.

Also during the first phase (Phase I Load), high level summaries of the billing information may be made. These summaries may include a summary by station, universal service order code (USOC), or other basis. Further, the records or tables for the Bill Image feature (described below) may also be created in this first phase. In addition, the records or tables for the Bill Image feature may be copied to an ASCII file that may be named appropriately for the respective month or on some other basis. For example, if the billing information that is being loaded is from a March 1997 electronic bill, then the ASCII file may be named "March 1997—service provider 'A'". This ASCII file may be used to browse the billing information in connection with the Bill Image feature.

In the second phase (Phase II Load) of the process that loads the billing information from the electronic bill, the billed items on the electronic bill are assigned to the appropriate element or department within the customer's organization. The assignment of a billed item to the appropriate element may be carried out automatically pursuant to the billing analysis and management system, or may be carried out by the customer in conjunction with the billing analysis and management system. Generally stated, the assignment of billed items from an electronic bill to an element may depend on the mode used to make the assignment. These modes are system configuration parameters. These modes may include: Mode 1—assignment based on use of department identifier (DI) codes. Mode 2—assignment based on use of the organizational hierarchy as defined by the customer; or Mode 3—assignment based on other factors.

In Mode 1, the Billed Items table generated in Phase I from the electronic bill is used to assign billed items to the appropriate elements or departments. As noted, each entry in the Billed Items table may include a billed item and/or its associated department identifier (DI). Thus, in this mode, the billed item is assigned to the element or department corresponding to the department identifier (DI) with which it was associated in the Billed Items table. In other words, the elements corresponding to the department identifiers (DIs) in the Billed Items table constitute entries in a directory file to which billed items may be automatically assigned.

In Mode 2, as noted, a billed item is assigned based on the use of the organizational hierarchy as defined by the customer. In this mode, a Cumulative table is provided which includes a cross reference between a billed item and the element or department to which it is to be assigned. When an electronic bill is loaded, the billed items are assigned based on the appropriate cross references in the Cumulative table. If the electronic bill includes a billed item that does not correspond to an entry in the Cumulative table, then the billed item is considered to be a "new" billed item. The customer is provided with the option of assigning the new billed item to a appropriate department. For example, the customer may be provided with a Hierarchy Member Assignment screen so that the customer may assign the new billed item to the appropriate element or department. After such assignment, the Cumulative table is updated with information including a cross reference between the new billed item and the element or department to which the new billed item is assigned.

In the telecommunications industry, several services or products may be initially billed to the customer's organization as a whole rather than billed to a specific directory number or even to a specific element or member of the customer's organization. Examples of these billed items or charges may include the following: advertising fees; taxes; and some types of directory assistance services. These types of billed items or charges are referred to herein as bulk billed items or charges. One embodiment provides the customer with the option of assigning these bulk billed items or charges generally in the same manner as the above-referenced new billed items. In the case of a bulk billed item or charge, the Load Bill feature prompts the customer to select the appropriate element or member of the organization to which the bulk billed item is to be assigned. Once the customer indicates the selected element or member, the billed item or charge is automatically allocated to the selected element or member. Also, an appropriate entry is added to the Cumulative table that makes a cross reference between the billed item or charge and the selected member or element. In this manner, the next such bulk billed item or charge is allocated based on the customer's previously indicated selection of element or member of the customer's organization.

In Mode 3, all billed items are assigned to a single element or department. For example, all billed items may be assigned to the highest department or element in the organizational hierarchy. If the customer is a corporation, then the highest department is the "corporation" as opposed to its constituent departments, members or elements, and all billed items are assigned to the corporation.

Also during the second phase (Phase II Load) of the process that loads the billing information from the electronic bill, the historical summary of charges and summaries based on the customer maintained hierarchy may be generated. These summaries may include summaries by department, division, general ledger (G/L) codes, historical summaries, and other summaries.

The present billing analysis and management system provides additional functionality with respect to the manipulation and assignment of billed items or charges on an electronic bill. For example, there may be billed items or charges that do not fall into any of the above-referenced categories or that may remain unassigned based on the above-described modes. With regard to these cases, the exemplary system may maintain a list of charge codes for reference. When such a case is encountered, then the system may use this list of charge codes to allocate or assign the unassigned billed item or charge to the elements or members of a level in the hierarchy of the customer's organization. This level in the hierarchy and the list of charge codes may be selected by the customer through use of the feature relating to the system configuration parameters as described below in connection with the Administration feature. Further, the system provides that the unassigned billed item or charge may be assigned or allocated on a percentage basis with respect to the elements or members of the level in the hierarchy of the customer's organization. The percentage to be charged to each element may vary, and may be selected by the customer through the system configuration parameters. By default, the billed items or charges are spread evenly amongst the elements of members of the level in the hierarchy. Examples of billed items or charges that may appear in these references cases include the following: adjustments without assignment (adjustments that appear on an electronic bill as assigned to a specific DI or EN are allocated only to that DI/EN); charges or billed items without a department identifier (DI) in the mode where the customer is using DIs; wide area telecommunications usage charges such as Watssaver COP usage charges; refunds; customer premise equipment (CPE) maintenance contracts; and local usage summaries.

Another function that may be provided by the billing analysis and management system with respect to the manipulation and assignment of billed items or charges on an electronic bill relates to miscellaneous charges. Pursuant to this function, the customer has the ability to spread certain charges by selected percentages across elements, members or departments of the customer's organization. For example, assume the customer uses Mode 1 described above to assign billed items based on a department identifier (DI). Then, the customer may spread specific charges assigned to a particular level in the hierarchy of the customer's organization to other levels in the hierarchy, and these specific charges may be spread based on percentages selected by the customer. Further, the customer may assign all common equipment charges to different levels in the hierarchy of the customer's organization. As another example, assume the customer uses a feature referred to as CLUB department identifier (CLUB DI) for the assignment of billed items or charges. Then, the customer may spread the billed items or charges relating to common equipment (and that may or may not include a department identifier) and billed items or charges relating to local usage summaries to other department identifiers as selected by the customer. This spreading of charges also may be based on varying percentages as selected by the customer.

In the exemplary embodiment, the Load Bills feature may be disabled under certain circumstances. For example, the Load Bills feature may be configured such that it does not read, translate, decompress or load information from an electronic bill: (A) that is from a particular service provider; (B) that is dated prior to a selected date; or (C) that stands in a selected relationship to some other fact. This disablement feature may be implemented so as to prevent a customer from continuing to use the billing analysis and management system after the customer gives up or loses a license to use the billing analysis and management system or otherwise is unauthorized to use the system.

As a further example of a disablement aspect of the Load Bills feature, consider that an exemplary embodiment of the billing analysis and management system may be licensed to a customer by telecommunications service provider "A". This exemplary billing analysis and management system may read electronic bills submitted by service provider "A" as well as other service providers. As part of reading these electronic bills, the system may compare certain information between and among the electronic bills. Such comparison may be conducted with respect to the dates of each electronic bill. If the customer gives up or loses the license to use this exemplary billing analysis and management system, then service provider "A" may cease to provide electronic bills for its services to the customer. Thus, the last bill provided by service provider "A" will become dated or out-of-date. Of course, other service providers may continue to provide electronic bills to the customer.

The billing analysis and management system may be configured such that the Load Bills feature is disabled if the electronic bill of service provider "A" is older by a selected time period than an electronic bill of another service provider. In other words, the billing analysis and management system, and in particular, the Load Bills feature will not read, translate, decompress or load any electronic bills if the comparison of information between and among the electronic bills results in a particular determination. In this manner, service provider "A" as the purveyor of the billing analysis and management system may prevent its former customers from using the system without authorization.

B. Query feature

The Query feature of the billing analysis and management system allows a customer to make a query for specific information stored in the billing information database. This feature also allows the customer to build, execute and save the query. In addition, this feature allows the customer to include this specific information in a printed report. Advantageously, the customer may customize the sequence and grouping of the specific information into a printed report. Yet another advantage of this query feature is that it is user-friendly in that the customer is not required to have knowledge of the structure or tables of the billing information database.

As noted above, one embodiment of the billing analysis and management system categorizes billing information in an electronic bill into several categories including: (1) Monthly Charges; (2) Other Charges & Credits; (3) Usage Charges; (4) Taxes, (5) Payments and Adjustments. Of course, the categories may include sub-categories and data fields, and the billing information may be categorized across these sub-categories and data fields. Pursuant to the Query feature of the billing analysis and management system, the customer may perform an ad-hoc query for information with respect to any of these categories.

An exemplary embodiment of a Query feature provides a Query screen display for use by the customer in constructing and executing a query. An exemplary Query screen display is illustrated in FIG. 9. In this type of Query feature, the customer provides information so as to build the query. Once all of the appropriate information is provided by the customer, then the query may be invoked or activated by clicking on a find button or in some other manner. The query results then may be displayed to the customer on a Query Results screen display.

The exemplary Query screen display requires that the customer specify the month (Invoice month) and the category for the query. After the category is selected, the Query feature of the billing analysis and management system may obtain, group or otherwise index or flag the information pertaining to this selected category from the billing information database into a logical record set. If this information is distributed amongst tables in the billing the fields of the billing information database, then this information may be grouped and presented such that the information represents a single flat file as the logical record set. It is this logical record set against which the query is performed.

The exemplary Query screen display provides several different areas for use by the customer. The exemplary Query screen display provides a hierarchy grid including a hierarchical listing of the elements, members of departments of the customer's organization. The customer may use the hierarchy grid to restrict the scope of the query to a particular element of the organization. The exemplary Query screen display further provides a field area that displays or provides a pull-down list of the sub-categories or data fields pertaining to the category selected by the customer. The customer may limit the query to one of the sub-categories or data fields in the list by clicking-on or otherwise activating the selected sub-category or data field. In addition, the exemplary Query screen display provides a comparison area wherein the customer may enter a selected operand for use in the query. The operands may include the following: Equal To; Not Equal To; Greater Than; Not Greater Than; Less Than; Not less Than; Between; Like; and Not Like. The exemplary Query screen display also provides a value area which provides for the entry of information by customer. The information in the value area is used by the query feature as the substantive criteria by which to select or obtain a record or other information from the logical record set in response to the query. Appropriate values that may be entered in the value area are presented by the query feature in a scrolling or pull-down list from which the customer may choose a value. In addition, the exemplary Query screen display provides one or more "or" areas so that more than one value may be chosen by the customer for use in the query. Thus, the information that may be entered in these "or" areas is limited to the same appropriate values that may be entered in the previously mentioned value area of the exemplary Query screen display.

Generally, the Query feature provides a customer interface that is of intermediate complexity so that the customer may execute intermediate level queries without having to understand the structure of the billing information database. Of course, those skilled in the art will understand that the Query feature may be implemented with an interface, and in particular, with a Query screen display, of lesser or greater complexity. Further, the intermediate level Query screen display may be used to make queries and then the information obtained in response to the queries may be exported to other programs for further evaluation.

C. Invoice

The present billing analysis and management system provides the customer with screen displays of information such that the customer may review a bill from a service provider, and in particular, may review the charges for billed items on the bill as they are assigned to any particular element of the customer's organization. For example, the system may provide the customer with an Invoice Screen display such as illustrated in FIG. 10. In the upper left hand quadrant of the Invoice Screen, the elements of the customer's organization are displayed based on the hierarchy of the customer's organization as provided by the customer. To view the charges of billed items assigned to any particular element of the customer's organization, the customer may click-on or otherwise activate the particular element of interest in the screen display in the upper left hand quadrant. In response to this activation, the Invoice Screen displays the charges of billed items assigned to the activated element. As illustrated in the Invoice Screen display of FIG. 10, the activated element is the highest ranking element in the organizational hierarchy, i.e., the corporation—The XYZ Corporation. Thus, the Invoice Screen of FIG. 10 displays the charges of billed items on the electronic bill of this service provider that are assigned to the corporation.

In one embodiment, the Invoice Screen display (as well as other screen displays) includes "Hot" areas whose activation results in further information being displayed. These "Hot" areas may include: current monthly charges; monthly charge variance; current usage charges; usage charge variance; current other charges & credits; and other charges & credits variance.

D. Exceptions

The Exceptions feature of the billing analysis and management system also provides the customer with screen displays of information relating to exceptions to the norm in billing information in an electronic bill. In particular, an "exception" may be some information that is unknown, that is different from known billed items or billing information or that is handled differently from billed items or billing information. An exception may include or be related to usage, a particular billed item, an unknown network user, a particular service provider, etc. An exception may be defined by the customer. For example, a billed item that reflects a telephone call of an extremely long duration or a high cost may constitute an exception. Another example of an exception may be a series of billed items reflecting repeated telephone calls to the same directory number within a preselected amount of time.

FIG. 10 illustrates an exemplary Calls Exceptions screen display as may be used with the billing analysis and management system of the present invention. This screen display or similar screen displays may be used by the customer to set the exception parameters and to generate an exception report.

E. Graphs feature

The Graphs feature of the present billing analysis and management system provides a set of graphs that may be used by the customer with screen displays to view certain billing information. Through the use of such graphs, the customer is able to spot trends, make cost comparisons, etc. Advantageously, the Graphs feature provides the customer with a simple and to the point mechanism to view information in varying formats.

In one embodiment of the billing analysis and management system, the Graphs feature includes ten graphs. These ten graphs may be categorized as graphs related to total charges, to usage, and to monthly charges. Another advantage of the billing analysis and management system is that the Graphs feature provides the customer with flexibility in selecting the data and information that may be incorporated into the graphs of the Graphs feature. The Graphs feature provides the customer with Data Selection Criteria screens for use in selecting data and information to be included in the graphs. A first type of screen display, Data Selection Criteria—General, allows the customer to enter information that may be applicable to all graphs. This information may include the invoice month, the service provider or vendor, and/or the hierarchy level or element of the organization. A second type of screen display, Data Selection Criteria—Overall, allows the customer to enter information that may be applicable with respect to the graphs relating to total charges and to the graphs relating to monthly charges. The information that may be entered through use of this Overall screen includes the following charge types: all; monthly; one-time; usage; adjustments; taxes; and other. A third type of screen display, Data Selection Criteria—Usage, allows the customer to enter information that may be applicable with respect to the graphs relating to usage. The information that may be entered through use of this Usage screen includes usage based on call method and usage based on call type. With respect to usage based on call method, the following information may be entered: all; third party; calling card; custom dialed; conference; collect; direct dialed; mutual honored; operator assisted; digital access cross connect (DACC) and other; With respect to usage based on call type, the following information may be entered: all; local; intrastate; interstate; international; 800/888; 900/976; telegram; directory assistance; and other.

Once the customer has selected the appropriate information, data or criteria to be included in the desired graph, the customer may proceed to use the graph(s) pursuant to the Graphs feature. As noted above, in the present billing analysis and management system, the Graphs feature includes ten graphs. These ten graphs may be categorized as graphs related to total charges, to usage and to monthly charges. With respect to the first category of graphs, total charges, the Graphs feature may provide a bar chart that plots the total charges for all of the months of the prior year against the total charges for the current year. Advantageously, with a glance, the customer is provided with a month-by-month comparison of the prior year against the current year.

With respect to the second category of graphs, usage, the Graphs feature provides seven different types of graphs. The first type of usage graph is a bar chart that illustrates the ten most frequently called Numbering Plan Areas (NPAs), sometimes referred to as area codes. All NPAs that are not one of the ten most frequently called NPAs are grouped as "Other" in this bar chart. The second type of usage graph is a bar chart that illustrates the ten most frequently called exchanges or central offices (NXXs), sometimes referred to as exchange numbers. All NXXs that are not one of the ten most frequently called NXXs are grouped as "Other" in this bar chart. The third type of usage graph is a bar chart that illustrates the number of calls for each day up to thirty-two days. The fourth type of usage graph is a bar chart that illustrates the average calls/minutes for each of the twenty-four hours in a selected period. The fifth type of usage graph is a pie chart that illustrates the calls/minutes/dollars expended to the ten most frequently called places or called directory numbers. The sixth type of usage graph is a pie chart that illustrates the calls/minutes/dollars for the various usage types. The seventh type of usage graph is a bar chart that illustrates the calls/minutes/dollars for the traffic carried by each service provider.

With respect to the third category of graphs, monthly charges, the exemplary Graphs feature provides two different types of graphs. The first type of monthly charge graph is a bar chart that illustrates the elements of a selected hierarchy level and the respective amount of monthly charges for which each element is responsible or has been charged, assigned or attributed. The second type of monthly charge graph is a pie chart that illustrates the monthly charges by charge categories.

F. Bill Image feature

The Bill Image feature of the present billing analysis and management system allows a customer to browse or print all or selected portions of the billing information of an electronic bill and to do so in the same sequence as could be done with a paper format of the bill. The bill, or portions thereof, printed from the electronic bill is similar in format to the bill that the customer would have received in paper format directly from the service provider.

In one embodiment, the print image records of the billing information on an electronic bill that may be used in connection with this Bill Image feature are stored as line printer records in the billing information database. These records may be displayed verbatim to the customer. These records may be displayed in a scrolling window.

In addition, the Bill Image feature provides the customer with the following functions as an aid to reviewing and searching an electronic bill: go to the beginning of the bill; go to the end of the bill; go to a specific page; move to a carrier; move to a section; move to an item number; or print all or selected sections of the bill such as summary pages, index pages, payments & adjustments; bulk billed items; and pages nnn thru mmm.

G. Budget feature

The Budget feature of the present billing analysis and management system allows a customer to conduct budgetary functions. For example, the customer may create or set up a budget for charges for services or products with this feature. The customer may modify the budget as needed with this feature. The customer also may generate a report(s) with this feature, and print or graph the budget report(s). Such reports may include a comparison of the budget for charges with respect to an actual bill(s) or billed items , a comparison of the budget for charges with respect to an average bill for services, or a comparison of the budget with respect to a designated bill or charges for services. Further, this feature may be used to view or to otherwise list the budget amounts by budget category or the actual amounts by budget category. In addition, this feature may be used as a basis for forecasting future bills and charges. For example, this feature may be used to draw on historical data to provide a forecast for budget vs. actual bills and charges. The Budget feature assists the customer in developing a budget by providing the following functions: project the actual figures of the current year; and project the budget figures of the current year.

The customer may enter and maintain budget information at a single level of the hierarchy of the organization. Thus, for each element or member of the selected level of the organization, the Budget feature maintains entries or records in the budget tables. Typically, an entry includes an actual charge and the entry includes the budgeted charge. After an electronic bill with billing information is loaded, the billed items or other charges in the billing information are added to the appropriate entries in the budget tables. The billed items or charges may be summarized to the selected level of the hierarchy of the organization and then used to update the actual charge portion of the entries in the budget tables.

A contemplated advantageous function of the Budget feature is a non-delete function by which the budgets created by the customer are maintained as accurately as possible. Pursuant to this non-delete function, the customer is prevented from deleting a particular element of the organization from the hierarchy in certain situations. In particular, the customer is prevented from deleting a particular element until the budgeted/actual charges or billed items assigned to the particular element are re-assigned to another element of the organization. After the reassignment of the budgeted/actual charges, the particular element may be deleted from the organization.

H. Administration feature

The Administration feature of the present billing analysis and management system allows a customer to carry out typical administrative functions such as the following: add new users; delete users; and modify security access of users. In addition, the Administration feature allows a customer to carry out other administrative functions that may be particular to this system such as the following: generate a MagTape file; and maintain the directory/organizational hierarchy. Further, this feature allows a customer to set configuration parameters. Access to these administrative functions may be restricted and controlled through a password or logon id (identification) function.

In one embodiment, the Administration feature provides a function for setting configuration parameters. These parameters may include the following: security enabled/disabled; load multiple vendors; and current charge deviation range. This set configuration parameters function is typically implemented through the use of a System configuration parameters screen display such as the exemplary screen display illustrated in FIG. 11. This exemplary screen display includes respective fields for charge categories such as monthly charges; other charges & credits; and usage charges. For each of these fields, a corresponding field is provided wherein the customer may specify, select or otherwise activate a normal percentage deviation in that charge category. The normal percentage deviation may be calculated from some base charge set by the customer, from a past bill, from an averaged amount, or from some other amount as will occur to those skilled in the art. Further, this exemplary screen display provides a field wherein the customer may select or activate the function of highlighting abnormal deviations in charge categories. When activated, this function highlights or otherwise visually advises the customer that a charge category, or charges or billed items within a charge category, deviate more than the specified normal percentage deviation from some preselected amount. A deviation (whether plus or minus) that is greater than the specified normal percentage deviation is considered an abnormal deviation.

In the exemplary embodiment, the Administration feature provides a function for defining user logon ids and passwords. This function allows two types of passwords to be defined. These are administrative passwords and user passwords. An administrative password allows a user to execute all features and functions of the billing analysis and management system for all levels and elements in the hierarchy of the customer's organization.

Figure 12:
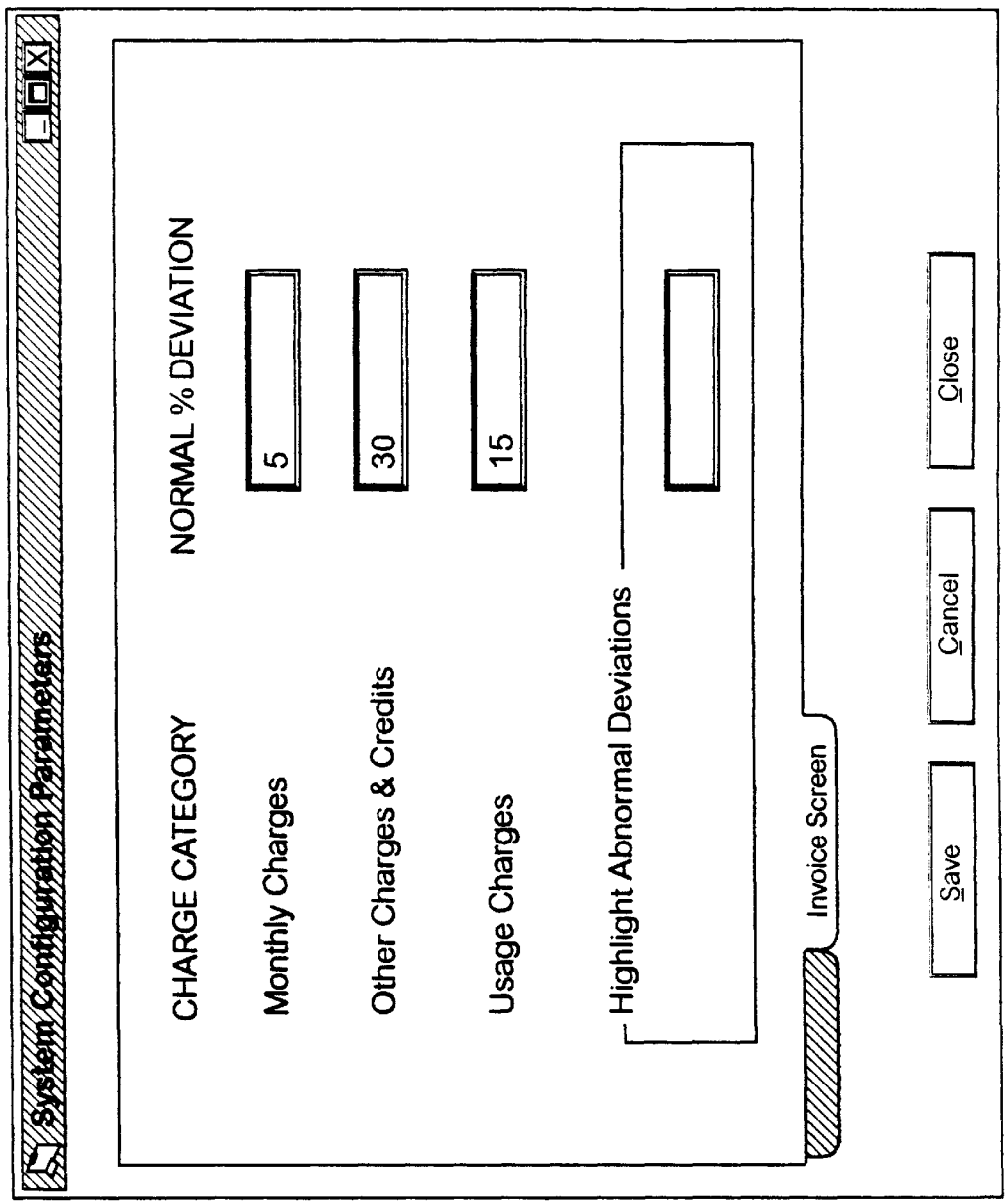

The other type of password is a user password, which allows a user to execute only non-administrative features and functions of the present billing analysis and management system. In addition, a user password may be limited by a hierarchy access setting. For a user password, the hierarchy access setting defines the information that the user is allowed to access and to view. This definition of information is based on or corresponds to the level or element of the hierarchy access setting. A user is allowed to access information only for the particular level or element and for levels or elements that are grouped within the particular level or element of the hierarchy access setting. For example, if the hierarchy access setting is set at the highest level in the hierarchy of the organization, i.e., the organization itself, then the user has access to information about every element and level in the organization. As another example, if the hierarchy access setting is set at a particular level that includes a number of elements, then the user has access to information about that particular level including the number of elements in that level. As a further example, if the hierarchy access setting is set at a particular element that does not include any further elements, then the user has access only to information about that particular element FIG. 12 illustrates an exemplary Passwords screen display for use by the customer in the implementation of this Administration feature and for the display of information related to this feature. In the central portion of the Passwords screen display, the elements and levels of the customer's organization are displayed based on the hierarchy of the customer's organization as provided by the customer. This hierarchy may be displayed in the form of an element list including each element of the organization listed in the element list in a hierarchical manner. To activate a hierarchy access setting, the customer may select or otherwise activate an element or a level from this element. Alternatively, the customer may provide a hierarchy access setting in a field in the screen display.

In one embodiment, the Administration feature provides a function for defining the directory or organizational hierarchy for use with this feature and other features of the billing analysis and management system. This organizational hierarchy function is typically implemented through the use of a screen displays such as the exemplary screen displays illustrated in FIGS. P-R. Even though the exemplary embodiment makes use of a plurality of screen displays with respect to this function, those skilled in the art will understand that this function may be implemented through single screen display.

FIG. 13 is an exemplary Hierarchy setup screen display which may be used by the customer to define the level of the organizational hierarchy. The Hierarchy setup screen display includes a field for the specification of the name of the customer's organization and for the definition of the number of levels in the organizational hierarchy. In addition, the Hierarchy setup screen includes fields wherein each level in the hierarchy may be assigned a name by the customer. Pursuant to this organizational hierarchy function, the information, selections and specifications by the customer are used to create the hierarchy of the customer's organization that may be displayed in the form of an element list including each element of the organization listed in the element list in a hierarchical manner.

After the levels of the customer's organizational hierarchy are defined pursuant to the organizational hierarchy function, then the elements or members of each level are defined. FIG. 14 is an exemplary Hierarchy setup screen display which may be used by the customer to define the elements or members of each level of the organizational hierarchy. The Hierarchy setup screen display includes a field for each level defined in the previous screen display and includes a corresponding field for the specification of the name of the elements for that level. This name field may include a place for a short name and a long name of the element. Pursuant to this organizational hierarchy function, the information, selections and specifications by the customer are used to create the hierarchy of the customer's organization that may be displayed in the form of an element list including each element of the organization listed in the element list in a hierarchical manner. It will be appreciated that this Hierarchy setup screen display may be used to remove elements from a particular level, to change elements in a level, etc.

Figure 15:
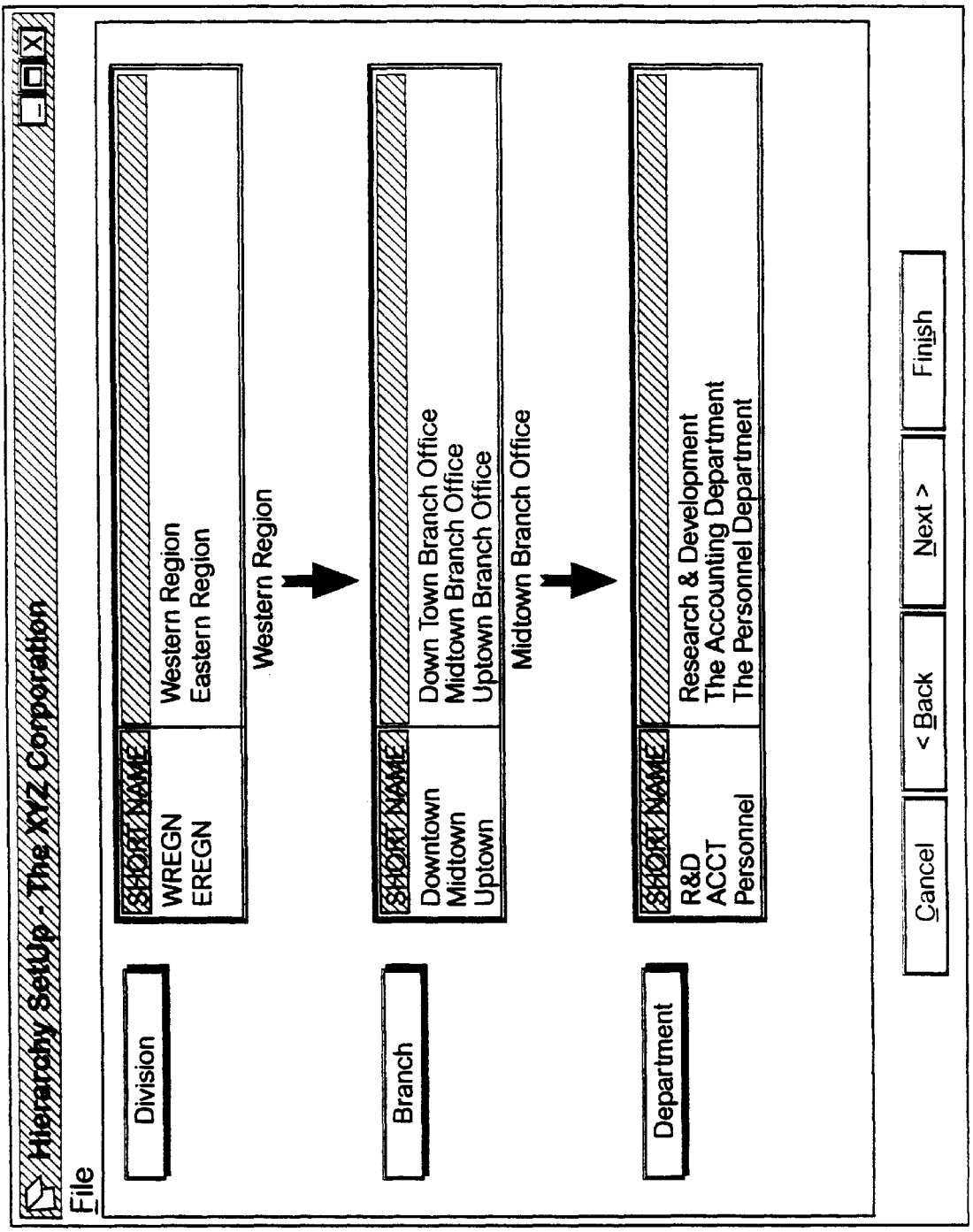

An advantage of the organizational hierarchy function is that the customer may maintain information about an element in connection with this function. In this manner, the customer or its users may access such information quickly and efficiently. This information may be used in other aspects of the billing analysis and management system. FIG. 15 is a Hierarchy member information screen display. This screen display may be used by the customer to store and maintain information about the elements or members of the organizational hierarchy. This screen display is directed towards a particular element of the customer's organization and includes fields for the following types of information related to this particular element: short name, long name; address; contact; and telephone number. This screen display also may include user defined fields such as the illustrated first user field and second user field. The information in these fields may be used in queries, in the generation of custom reports, and in other aspects of the present billing system.

In one embodiment, the billing analysis and management system maintains a cross-reference between charges or billed items and the elements or levels to which these charges or billed items are to be assigned or allocated. These elements or levels are also referred to as the "owners" of these billed items or charges. The Administration feature provides an item/owner function for the customer to set up and maintain the cross-reference table.

FIG. 16 illustrates an exemplary Assign Billed Items to Hierarchy Member screen display for use by the customer in the implementation of this Administration feature and for the display of information related to this feature. In the left portion of the Assign Billed Items to Hierarchy Member screen display, the elements and levels of the customer's organization are displayed based on the hierarchy of the customer's organization as provided by the customer. This hierarchy may be displayed in the form of an element list including each element of the organization listed in the element list in a hierarchical manner. In the right portion of the Assign Billed Items to Hierarchy Member screen display, two blocks including fields are provided. One of these blocks is the unassigned items block and the other is the assigned items block. In the unassigned items block, fields are provided that may include unassigned billed items or charges. An unassigned billed item or charge is a billed item or charge that has not been associated, assigned, or attributed to an element or level of the customer's organization. This unassigned items block may be populated with information during use of the Load Bills feature of the present billing analysis and management system. For example, during use of the Load Bills feature, a billed item or charge that is included in the billing information that is being loaded and that does not have a correspondence or cross-reference to an element or level of the organization may be populated in this unassigned items block of the Assign Billed Items to Hierarchy Member screen display. On the other hand, the assigned items block of this display may be populated with billed items or charges that have a correspondence or cross-reference to an element or level of the organization. The assigned items block may include an identification of the owner of the billed item or charge.

Pursuant to the exemplary embodiment, the assignment of an unassigned billed item or charge takes two steps. As a first step, an element or level of the hierarchy of the organization is selected or activated in the element list displayed on the Assign Billed Items to Hierarchy Member. Then, as a second step, an unassigned billed item or charge is selected or activated in the unassigned items block of this screen display. This selection or activation may be accomplished by double-clicking upon the appropriate entry or field. Once the unassigned billed item or charge has been selected, it is removed from the unassigned items block and added to the assigned items block.

The Administration feature provides a MagTape generation function for the customer to off-load the billing information or portions thereof in a standard 450 Byte MagTape format. Advantageously, this function allows a customer to process the billing information through other programs. FIG. 17 illustrates an exemplary Generate MagTape screen display for use by the customer in the implementation of this Administration feature and for the display of information related to this feature. Another advantage of this feature is that the customer has flexibility in selecting the billing information including record types to be off-loaded with this function. For example, the customer may select the invoice month or billing month including billing information. The exemplary Generate MagTape screen display includes a field for the specification or activation of a particular invoice month. As another example, the customer may select the specific types of billing information or records types to be included in the information that is off-loaded pursuant to this function. Typically, the billing analysis and management system keeps track of and displays the number of records or entries for each type of record or entry.

For use in connection with this MagTape generation function, the exemplary Generate MagTape screen display includes a source records block for the display of information relating to the types of records, descriptions of the types of records, and the number of records by type. Further, the customer is provided with an "Include" field for each entry in the source records block. If the customer specifies a "yes" in the include field of a particular entry in the source records block, then the records of that entry are included in the MagTape generation function. On the other hand, if the customer specifies a "no" in the include field of a particular entry, then the records of that entry are not included in the MagTape generation function. As records or entries are included in the function, a running count of the records and file size is kept and displayed in the appropriate entry in the source records block. Further, the exemplary Generate MagTape screen display includes a destination file block for the customer's use in specifying the destination of the information that is being off-loaded pursuant to this function. Advantageously, this MagTape generation function takes certain steps prior to executing the off-loading of the elected information. The function verifies that all requisite information for the off-loading of the information has been specified. Further, the function verifies that there is adequate free storage on the target destination to hold the records that will be off-loaded. Finally, while the off-loading of the information takes place, the function provides a progress meter as a visual aid or graphic indication to the user with respect to the completion status of the off-loading task.

I. Report feature

The Report feature of the present billing analysis and management system allows a customer to create, view and print a report with respect to many of the other features and functions of the system. Generally, each display screen of the exemplary embodiment includes a Report command button whose activation invokes the Report feature. In particular, in response to the activation of the Report command button, a context sensitive Report menu is displayed to the customer. The Report menu functions as a gateway to the Report feature.

Figures 18, 19:
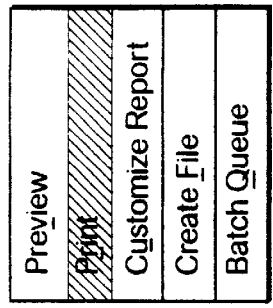

An exemplary Report menu is illustrated in FIG. 18, and includes the following selections with respect to the Report feature: preview; print; customize report; create file; and batch queue. When a selection of this Report menu is inapplicable to the context in which the menu is invoked or is inapplicable in connection with the feature or function at issue, then the selection is disabled and appears grayed to the customer. When the preview selection of the Report menu is activated, then the appropriate report is generated and displayed to the customer in a screen display. The customer may print the report while the customer previews the report. When the print selection of the Report menu is activated, then the appropriate report is generated and sent to the printer.

When the customize report selection of the Report menu is activated, then this Report feature allows the customer to save the underlying data selection criteria for a display along with the associated standard report definition, or a modified version thereof, as a user defined report. Thus, the customize report selection also may be referred to as a make user defined report selection. Typically, the Report feature includes functionality to allow a customer to customize a standard report format. This customization function may be implemented through the use of a User Defined Report screen display such as the exemplary screen display illustrated in FIG. 19. In this exemplary screen display, three list boxes are provided as follows: report fields; sort by; and group by. When this screen display is provided to the customer, these list boxes are locked so as to protect against inadvertent modifications. The following command buttons are provided on this screen display for use with the customization function: modify; save; save as . . . ; cancel; close; and report.

Still referring to FIG. 19, when the modify command button is selected or activated, then the three list boxes are unlocked so that the customer may modify the definition of the report. Modifications to a report may be limited based on the type of report engine or other tool or system used in connection with the Report feature and with this customization function. In the exemplary embodiment, a Crystal Report Writer is used as the report engine. Generally, the modifications that may be made pursuant to this customization function include the following: change the sort order/sequence of fields; change the grouping fields; and suppress the printing of one or more fields.

With respect to the other command buttons, when the save command button is selected or activated, then the displayed report definition is saved. When the save as . . . command button is selected, then a dialog box is presented to the customer with a request for the name for saving the report definition. From this selection, the customer is able to launch the batch queue function. When the cancel command button is selected, then the current customization sequence is canceled. When the close command button is selected, then the report form is closed. And when the report command button is selected, then the Report menu is displayed to the customer.

The Report feature may also include other functions. For example, the Report feature may include the create file function. Pursuant to this create file function, the selected records may be routed to an ASCII file on disk or elsewhere.

As another example, the Report feature may include the batch queue function which allows the customer to group reports into batches. This batch queue function may simplify the generation of report sets. For example, if different groups of varying reports are to be produced, these groups may be defined as batches. Then, in order to generate a specific group, the customer merely selects that batch and processes it. This batch queue function is typically implemented through the use of a Batch Queue screen display such as the exemplary screen display illustrated in FIG. 20. As illustrated, this Batch Queue screen display includes a batches window that displays the name and description of all currently defined batches. Upon display of this Batch Queue screen display, the first batch is visually highlighted for the convenience of the user. The batches window may include command buttons. For example, the batches window may include an add batch command button for defining a new batch to the system. The batches window also may include a delete batch command button for deleting an existing batch. In addition, the batches window may include a process batch command button for generating the reports for the respective batch. The customer may select or activate an entry or batch from this batches window.

Still referring to the Batch Queue screen display of FIG. 20, this screen display also includes a reports window that displays a list of reports. The options for the reports window include the following: reports in selected batch; reports in all batches; standard reports; user defined reports; and all reports. This reports window also includes the self explanatory command buttons of insert, remove and report. With respect to the option of reports in selected batch, the reports window displays the reports that are associated with the batch that is selected in the batches window. Advantageously, the customer may use the insert or remove command button to respectively add or delete a report from a batch. The customer also may use the report command button to run or print the report that is selected or highlighted in the reports window.

With respect to the option of reports in all batches available for the reports window of the batch queue screen display, this option provides that all reports appearing, listed or associated with batch queues of the batches window will be listed or displayed in the reports window. Advantageously, the customer is able to insert a report from this list of all reports into the batch which is selected or highlighted in the batches window. With respect to the option of standard reports, this option provides that all standard reports are listed in the reports window. Advantageously, the customer is able to insert a report from this list of standard reports into the batch which is selected or highlighted in the batches window. With respect to the option of user defined reports, this option provides that all user defined reports are listed in the reports window. Advantageously, the customer is able to insert a report from this list of user defined reports into the batch which is selected or highlighted in the batches window. With respect to the option of all reports, this option provides that all reports, standard and user defined, are listed in the reports window. Advantageously, the customer is able to insert a report from this list of all reports into the batch which is selected or highlighted in the batches window.

3. Exemplary Tables of the Billing Information Database

Figure 21:
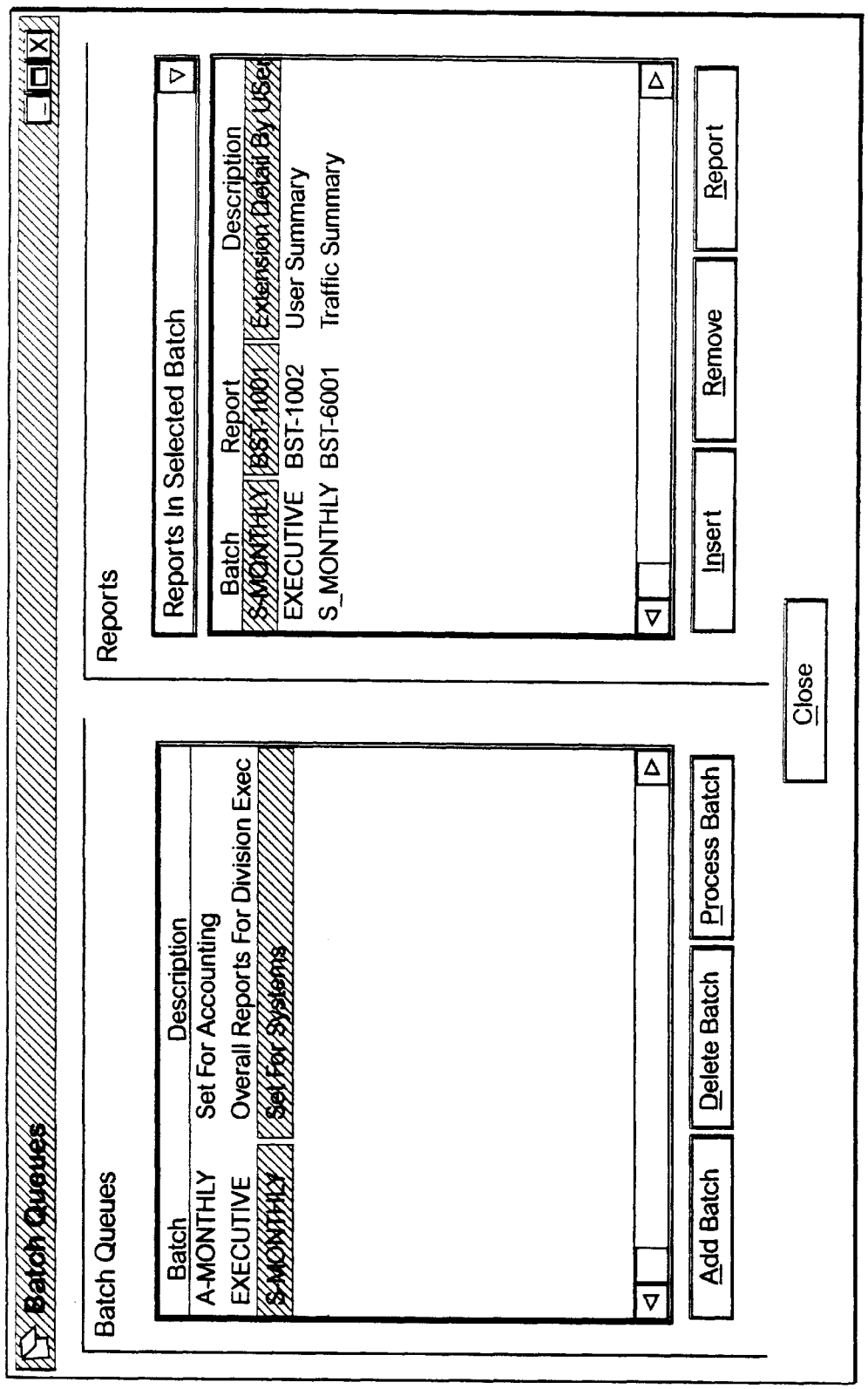
Figure 22:
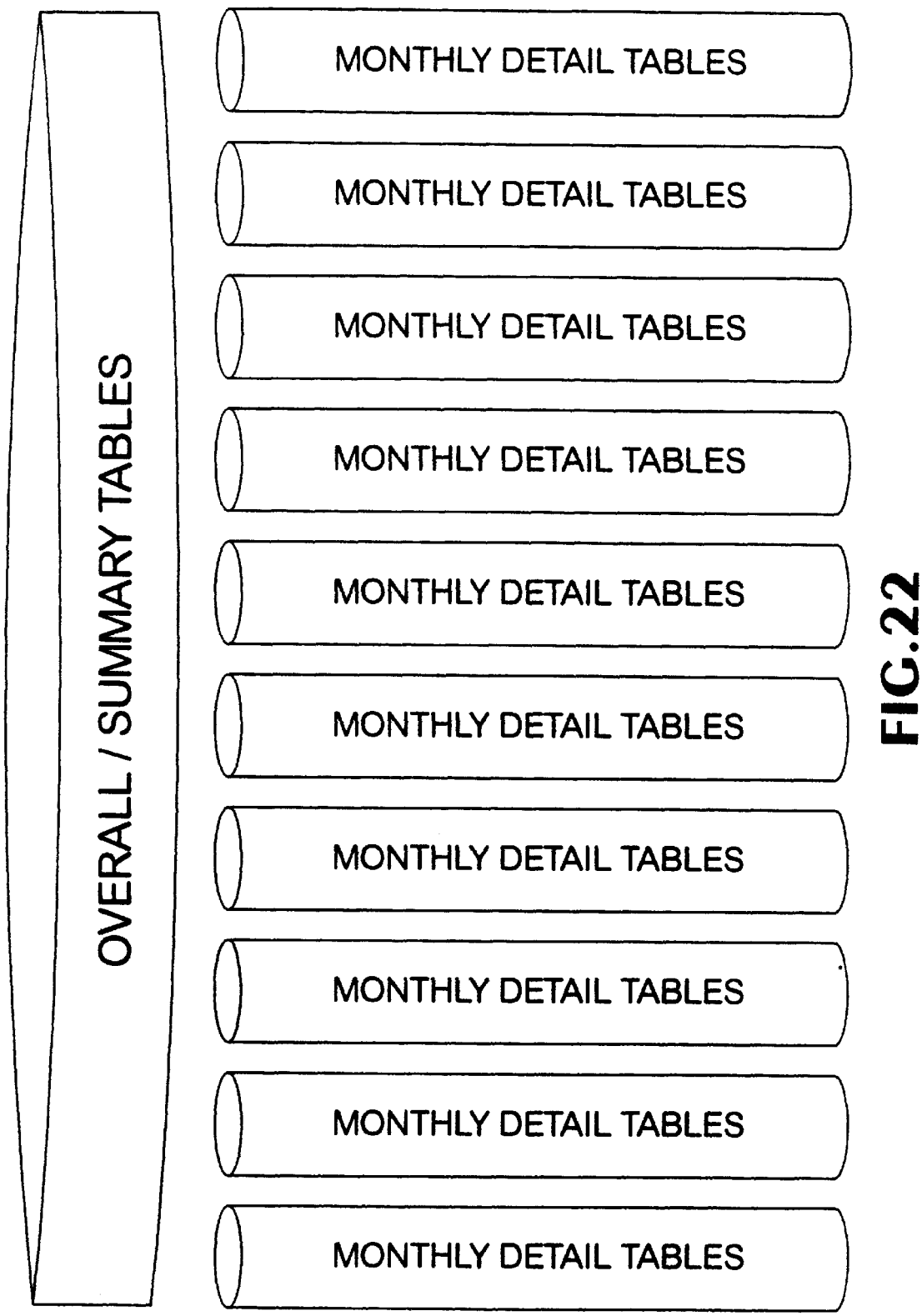
FIG. 22 illustrates the configuration of the relational tables and databases associated with the billing analysis and management system.

In one embodiment, the billing information database includes a plurality of relational tables. These tables logically fall into two groups: (1) overall/summary tables, and (2) monthly detail tables. The overall/summary tables typically reside in the overall/summary database. The monthly detail tables typically reside in the monthly detail database. A monthly detail database corresponds to a particular month of a particular invoice or electronic bill from a service provider. The configuration of these relational tables and databases is illustrated in FIG. 21.

The overall/summary tables may include the following tables or other information: configuration parameters; hierarchy definition; budget/actual amounts by appropriate hierarchy element or member of the customer's organization; summary of expenses by invoice or billing month; and item/owner cross reference. Each of these tables may include fields as appropriate to the billing information that is analyzed and managed by the customer through the present system.

The monthly details tables may include the following tables or other information: circuits; monthly activity; monthly services and features; taxes summary; and usage. Each of these tables may include fields as appropriate to the billing information that is analyzed and managed by the customer through the present system.

What is claimed is:

1. A method to analyze information regarding the association of services with elements of an organization, comprising the steps of:

A. displaying an organizational hierarchy on a display device, the organizational hierarchy comprising a list of elements and subelements of an organization, and the display device comprising a single frame bounded by a single view;

B. displaying a services list on the display device, the services list comprising a plurality of services available to the organization, wherein each service may be comprised of one or more subcategories of services;

C. associating each said service from the services list with the respective said elements from the organizational hierarchy that have utilized the service;

D. interpreting an input signal as representing a selected element from the organizational hierarchy or a selected service from the services list; and E. in response to interpreting the input signal, if the signal represents the selected element, then displaying on the display device each said subelement that comprises the selected element, each said service from the services list that is associated with the selected element, and a dynamic display of information relating to the usage of each said service by the selected element and said subelements; or if the signal represents the selected service, then displaying on the display device any subcategories of services that comprise the selected service, each element and subelement from the organizational hierarchy that is associated with the selected service, and a dynamic display of information relating to the usage of the selected service and said subcategories of services by each said element and subelement.

2. The method of claim 1, further including the step of generating reports based on said dynamic display of information.

3. The method of claim 1, wherein the dynamic display of information in Step E comprises data relating to usage fees for each said service incurred by each said element and subelement.

4. The method of claim 1, wherein the single frame is comprised of a first sub-frame and a second sub-frame;

wherein Step A comprises displaying the organizational hierarchy in the first sub-frame; and wherein Step B comprises displaying the services list in the second sub-frame.

5. The method of claim 1, wherein the display device comprises four quadrants, including a quadrant A being an upper left quadrant, a quadrant B being an upper right quadrant, a quadrant C being a lower left quadrant, and a quadrant D being a lower right quadrant;

wherein Step A comprises displaying the organizational hierarchy in the quadrant A;

wherein Step B comprises displaying the services list in the quadrant C; and wherein Step E comprises if the signal represents the selected element, then displaying in the quadrant B each said subelement that comprises the selected element, displaying in the quadrant D each said service from the services list that is associated with the selected element, and displaying in both said quadrants B and D a dynamic display of information relating to the usage of each said service by the selected element and its said subelements; or if the signal represents the selected service, then displaying in the quadrant D any subcategories of services that comprise the selected service, displaying in the quadrant B each element and subelement from the organizational hierarchy that is associated with the selected service, and displaying in both said quadrants B and D a dynamic display of information relating to the usage of the selected service and its said subcategories of services by each said element and subelement.

6. The method of claim 5, wherein the dynamic display of information in Step E comprises data relating to usage fees for each said service incurred by each said element and subelement.

7. A computer-readable medium having computer-executable instructions for performing the steps of claim 1.

8. The computer-readable medium of claim 7 having further computer-executable instructions for performing the step of generating reports based on the dynamic display of information.

9. The computer-readable medium of claim 7 wherein, the dynamic display of information displayed by the computer-executable instruction for performing Step E, comprises data relating to usage fees for each said service incurred by each said element and subelement.

10. The computer-readable medium of claim 7 having further computer-executable instructions for dividing the single frame into a first sub-frame and a second sub-frame;

wherein the computer-executable instructions for executing Step A further include provide for displaying the organizational hierarchy in the first sub-frame; and wherein the computer-executable instructions for executing Step B further provide for displaying the services list in the second sub-frame.

11. The computer-readable medium of claim 7 having further computer-executable instructions for dividing the single frame into four quadrants, including a quadrant A being an upper left quadrant, a quadrant B being an upper right quadrant, a quadrant C being a lower left quadrant, and a quadrant D being a lower right quadrant;

wherein the computer-executable instructions for executing Step A further provide for displaying the organizational hierarchy in the quadrant A;

wherein the computer-executable instructions for executing Step B further provide for displaying the services list in the quadrant C; and wherein the computer-executable instructions for executing Step E further provide for if the signal represents the selected element, then displaying in the quadrant B each said subelement that comprises the selected element, displaying in the quadrant D each said service from the services list that is associated with the selected element, and displaying in both said quadrants B and D a dynamic display of information relating to the usage of each said service by the selected element and its said subelements; or if the signal represents the selected service, then displaying in the quadrant D any subcategories of services that comprise the selected service, displaying in the quadrant B each element and subelement from the organizational hierarchy that is associated with the selected service, and displaying in both said quadrants B and D a dynamic display of information relating to the usage of the selected service and its said subcategories of services by each said element and subelement.

12. The computer-readable medium of claim 11 having further computer-executable instructions for performing the step of generating reports based on the dynamic display of information.

13. The computer-readable medium of claim 11, wherein the dynamic display of information, displayed by the computer-executable instruction for performing Step E, comprises data relating to usage fees for each said service incurred by each said element and subelement.

14. In a computer system including a display device and a user input device for generating an input signal, a display device having rendered thereon a single frame bounded by a single view;

wherein the single frame comprises four quadrants, including a quadrant A being an upper left quadrant, a quadrant B being an upper right quadrant, a quadrant C being a lower left quadrant, and a quadrant D being a lower right quadrant;

wherein an organizational hierarchy, comprised of elements and subelements of an organization, is displayed in the quadrant A;

wherein a services list, comprised of a plurality of services available to the organization, is displayed in the quadrant C;

wherein
      if the input signal represents a selected element, then each said subelement that comprises the selected element is displayed in quadrant B, each said service from the services list that is associated with the selected element is displayed in quadrant D, and a dynamic display of information relating to the usage of each said service by the selected element and its said subelements is displayed in both the quadrants B and D; or
      if the input signal represents the selected service, then any subcategories of services that comprise the selected service are displayed in the quadrant D, each element and subelement from the organizational hierarchy that is associated with the selected service is displayed in the quadrant B, and a dynamic display of information relating to the usage of the selected service and its said subcategories of services by each said element and subelement is displayed in both said quadrants B and D.

* * * * *